US012676023B2

(12) United States Patent
Honjo

(10) Patent No.: US 12,676,023 B2
(45) Date of Patent: Jul. 7, 2026

(54) INFORMATION PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Tomoya Honjo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 18/438,006

(22) Filed: Feb. 9, 2024

(65) Prior Publication Data

US 2024/0265729 A1 Aug. 8, 2024

Related U.S. Application Data

(63) Continuation of application No. PCT/JP2022/028516, filed on Jul. 22, 2022.

(30) Foreign Application Priority Data

Aug. 13, 2021 (JP) ................................. 2021-132089
Feb. 9, 2022 (JP) ................................. 2022-018960

(51) Int. Cl.
*G06V 40/16* (2022.01)
*G06V 10/24* (2022.01)
(Continued)

(52) U.S. Cl.
CPC ............ *G06V 40/161* (2022.01); *G06V 10/24* (2022.01); *G06V 10/26* (2022.01); *G06V 10/98* (2022.01);
(Continued)

(58) Field of Classification Search
CPC ...... G06V 40/161; G06V 10/24; G06V 10/26; G06V 10/98; G06V 40/168; G06V 20/52;
(Continued)

(56) References Cited

U.S. PATENT DOCUMENTS 9,514,389 B1 * 12/2016 Erhan ................... G06V 10/454
10,235,607 B2 * 3/2019 Ohira ..................... G06V 40/16
(Continued)

FOREIGN PATENT DOCUMENTS

JP 2018180945 A 11/2018
JP 2020198053 A 12/2020

*Primary Examiner* — Michael S Osinski
(74) *Attorney, Agent, or Firm* — Canon U.S.A., Inc. IP Division

(57) ABSTRACT

An information processing apparatus comprising one or more hardware processors, and one or more memories storing one or more programs configured to be executed by the one or more hardware processors, the one or more programs including instructions to detect an object relating to a plurality of attributes from an image, determine overlapping of detection results for different attributes on detection results, extract a second image from the first image based on a determination result relating to the detection results of object detection on the first image, and correct the detection results of object detection based on the detection results of object detection on the second image extracted from the first image.

17 Claims, 20 Drawing Sheets

(51) Int. Cl.
  *G06V 10/26*          (2022.01)
  *G06V 10/98*          (2022.01)
  *G06V 20/52*          (2022.01)
(52) U.S. Cl.
  CPC ............ G06V 40/168 (2022.01); *G06V 20/52*
    (2022.01); *G06V 2201/07* (2022.01)
(58) Field of Classification Search
  CPC .... G06V 2201/07; G06V 10/82; G06V 10/25;
      G06V 10/764; G06V 20/58; G06V
      10/774; G06V 10/62; G06V 20/40; G06V
      40/10; G06V 40/16; G06V 40/165; G06V
      40/167; G06T 7/00; G06T 2207/20081;
      G06T 2207/20084; G06T 2210/12; G06N
      3/0464; G06N 3/09; G06N 3/08; G06N
      3/045
  See application file for complete search history.

(56)          References Cited

U.S. PATENT DOCUMENTS

| | | | | |
|---|---|---|---|---|
| 11,113,836 | B2 * | 9/2021 | Wang ........................ | G06T 7/62 |
| 12,387,348 | B2 * | 8/2025 | Ge ........................... | G06T 7/277 |
| 2008/0002890 | A1 * | 1/2008 | Hu ........................ | G06V 40/162 |
| | | | | 382/203 |
| 2009/0052746 | A1 * | 2/2009 | Aoki .................... | G06V 40/173 |
| | | | | 382/115 |
| 2012/0002067 | A1 * | 1/2012 | Fukata ..................... | G06T 7/74 |
| | | | | 348/222.1 |
| 2012/0051594 | A1 * | 3/2012 | Kim ....................... | G06V 20/52 |
| | | | | 382/103 |
| 2013/0077866 | A1 * | 3/2013 | Singer .................... | G06F 16/78 |
| | | | | 382/190 |
| 2014/0241623 | A1 * | 8/2014 | Wang .................. | G06F 18/2148 |
| | | | | 382/160 |
| 2016/0335490 | A1 * | 11/2016 | Wang ..................... | G06V 20/53 |
| 2017/0061229 | A1 * | 3/2017 | Rastgar .................... | G06T 7/248 |
| 2017/0286779 | A1 * | 10/2017 | Fan ...................... | G06F 18/2415 |
| 2018/0025636 | A1 * | 1/2018 | Boykin ........... | G08G 1/096725 |
| | | | | 701/1 |
| 2018/0121736 | A1 * | 5/2018 | Tsunashima ........... | H04N 23/00 |
| 2018/0136332 | A1 * | 5/2018 | Barfield, Jr. ....... | G06V 10/7784 |
| 2018/0173959 | A1 * | 6/2018 | Shah .................... | G06V 40/168 |
| 2019/0130580 | A1 * | 5/2019 | Chen ..................... | G06V 10/82 |
| 2019/0213420 | A1 * | 7/2019 | Karyodisa ............. | G06V 20/41 |
| 2019/0332897 | A1 * | 10/2019 | Chen ...................... | G06T 7/215 |
| 2020/0012894 | A1 * | 1/2020 | Lee ....................... | G06F 18/24 |
| 2020/0074665 | A1 * | 3/2020 | Wang ..................... | G06V 20/10 |
| 2020/0082581 | A1 * | 3/2020 | Chen ...................... | G06T 11/20 |
| 2020/0143205 | A1 * | 5/2020 | Yao ...................... | G06V 20/00 |
| 2020/0394447 | A1 * | 12/2020 | Chae ...................... | G06F 18/22 |
| 2021/0201007 | A1 * | 7/2021 | Shibata .................. | G06V 40/10 |
| 2021/0350161 | A1 * | 11/2021 | Mlynar .................. | G06T 11/20 |
| 2022/0044029 | A1 * | 2/2022 | Kirschner ............... | G06N 3/08 |
| 2022/0051020 | A1 * | 2/2022 | Jha ...................... | G06V 10/945 |
| 2022/0130140 | A1 * | 4/2022 | Shiraishi ............. | G06V 10/774 |
| 2022/0207259 | A1 * | 6/2022 | Zhang .................... | G06V 20/40 |
| 2022/0222480 | A1 * | 7/2022 | Jiang ..................... | G06V 10/22 |
| 2022/0297305 | A1 * | 9/2022 | Yu .......................... | G06V 20/52 |
| 2022/0413464 | A1 * | 12/2022 | Zeng ..................... | B33Y 50/00 |
| 2023/0215125 | A1 * | 7/2023 | Luo ...................... | G06V 10/225 |
| | | | | 382/159 |
| 2024/0029394 | A1 * | 1/2024 | Sekii .................... | G06V 10/476 |
| 2024/0037985 | A1 * | 2/2024 | Kimhi ................. | G06V 40/172 |
| 2024/0153106 | A1 * | 5/2024 | Sasatani ................ | G06V 20/70 |
| 2024/0185434 | A1 * | 6/2024 | Wyffels ................. | G06V 20/58 |
| 2024/0220200 | A1 * | 7/2024 | Furukawa ............... | G06N 3/02 |
| 2024/0312220 | A1 * | 9/2024 | Mishima ............. | G06V 10/809 |

\* cited by examiner

| DETECTION RESULT | (x1, y1), (x2, y2) | FACE ATTRIBUTE | RELIABILITY |
|---|---|---|---|
| A | (20, 200), (320, 500) | WEARING GLASSES | 0.55 |
| B | (40, 210), (340, 510) | NOT WEARING GLASSES | 0.60 |
| C | (500, 300), (750, 500) | NOT WEARING GLASSES | 0.85 |
| D | (800, 200), (1100, 500) | WEARING GLASSES | 0.91 |

(0, 0)

(1080, 720)

(0, 0)

(384, 372)

| DETECTION RESULT | (x1, y1), (x2, y2) | FACE ATTRIBUTE | RELIABILITY |
|---|---|---|---|
| E | (42, 36), (342, 336) | WEARING GLASSES | 0.88 |

| DETECTION RESULT | (x1, y1), (x2, y2) | FACE ATTRIBUTE | RELIABILITY |
|---|---|---|---|
| C | (500, 300), (750, 500) | NOT WEARING GLASSES | 0.85 |
| D | (800, 200), (1100, 500) | WEARING GLASSES | 0.91 |
| E | (30, 205), (330, 505) | WEARING GLASSES | 0.88 |

(0, 0)

~710

(384, 372)

| DETECTION RESULT | (x1, y1), (x2, y2) | FACE ATTRIBUTE | RELIABILITY |
|---|---|---|---|
| F | (49, 43), (399, 405) | WEARING GLASSES | 0.93 |

FIG.8C
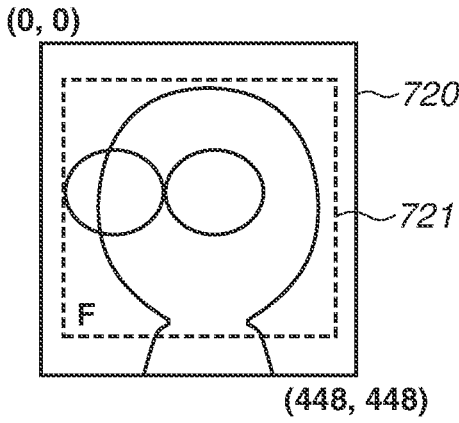
FIG.8D
| DETECTION RESULT | (x1, y1), (x2, y2) | FACE ATTRIBUTE | RELIABILITY |
|---|---|---|---|
| F | (42, 36), (342, 336) | WEARING GLASSES | 0.93 |
FIG.8E
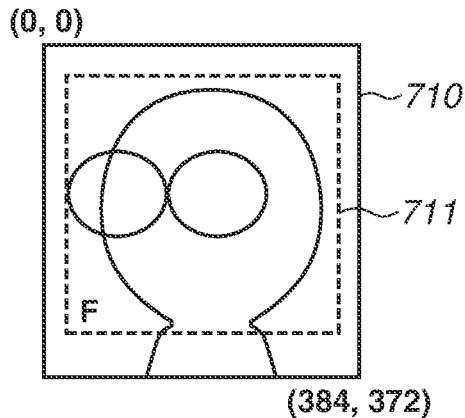

FIG.11A

| DETECTION RESULT | (x1, y1), (x2, y2) | FACE ATTRIBUTE | RELIABILITY |
|---|---|---|---|
| G | (32, 31), (332, 331) | WEARING GLASSES | 0.65 |
| H | (52, 41), (352, 341) | NOT WEARING GLASSES | 0.70 |

FIG.11B

| DETECTION RESULT | (x1, y1), (x2, y2) | FACE ATTRIBUTE | RELIABILITY |
|---|---|---|---|
| I | (20, 200), (340, 510) | UNKNOWN WHETHER GLASSES ARE WORN | 1 |

FIG.11C

| TRACKING ID | (x1, y1), (x2, y2) | FACE ATTRIBUTE | ATTRIBUTE STATISTICAL INFORMATION | |
|---|---|---|---|---|
| | | | WEARING GLASSES | NOT WEARING GLASSES |
| 1 | (20, 200), (320, 500) | WEARING GLASSES | 1 | 0 |
| 2 | (40, 210), (340, 510) | NOT WEARING GLASSES | 0 | 2 |
| 3 | (500, 300), (750, 500) | NOT WEARING GLASSES | 2 | 0 |

*1401*

(0, 0)

(1080, 720)

*1402*

(0, 0)

(720, 720)

*1403*

(0, 0)

(224, 224)

| DETECTION RESULT | (x1, y1), (x2, y2) | FACE ATTRIBUTE | RELIABILITY |
|---|---|---|---|
| A | (0, 62), (85, 156) | WEARING GLASSES | 0.55 |
| B | (0, 65), (91, 159) | NOT WEARING GLASSES | 0.60 |
| C | (116, 93), (194, 156) | NOT WEARING GLASSES | 0.85 |

| DETECTION RESULT | (x1, y1), (x2, y2) |
|---|---|
| A | (30, 199), (303, 501) |
| B | (30, 209), (323, 511) |

(0, 0)    *1404*

(351, 374)

(0, 0)   *1405*

(224, 224)

| DETECTION RESULT | (x1, y1), (x2, y2) |
|---|---|
| E | (16, 22), (207, 201) |

| DETECTION RESULT | (x1, y1), (x2, y2) |
|---|---|
| E | (26, 204), (326, 504) |

1

INFORMATION PROCESSING APPARATUS, INFORMATION PROCESSING SYSTEM, INFORMATION PROCESSING METHOD, AND STORAGE MEDIUM

CROSS-REFERENCE TO RELATED APPLICATIONS

This application is a Continuation of International Patent Application No. PCT/JP2022/028516, filed Jul. 22, 2022, which claims the benefit of Japanese Patent Applications No. 2021-132089, filed Aug. 13, 2021, and No. 2022-018960, filed Feb. 9, 2022, all of which are hereby incorporated by reference herein in their entirety.

BACKGROUND I/F THE INVENTION

Field of the Invention

The present invention relates to a technique for detecting an object from an image.

Background Art

In recent years, image analysis for detection and tracking of an object, estimation of an attribute of the object, and the like using an image captured by an imaging device, such as a monitoring camera, and estimation of the number of objects using the result of the image analysis have been carried out on various occasions. In the object detection, for example, information about the position and size of a detection target object, the attribute of the object, the reliability of the object, and the like is output. In the object detection, a plurality of detection results can be obtained for one object in some cases. This leads to deterioration in the reliability of detection results, deterioration in the reliability of statistical data, and the like. To address this issue, Japanese Patent Application Laid-Open No. 2018-180945 discusses a technique for integrating detection frames overlapping each other with a degree of overlapping of more than or equal to a threshold depending on the properties of the detection frames based on the position and size of the detection frames output for each detection processing frame, and outputting the integrated detection frames as a final object detection frame.

In the technique discussed in Japanese Patent Application Laid-Open No. 2018-180945, even when the reliability of the detection result is low, the detection frames are integrated using the detection result and the integrated detection frames are output as the final object detection frame. This may lead to deterioration in the reliability of the final object detection frame.

CITATION LIST

Patent Literature

PTL 1: Japanese Patent Application Laid-Open No. 2018-180945

SUMMARY OF THE INVENTION

The present invention has been made in view of the above-described circumstances and is directed to providing a technique for finally outputting a more appropriate detection result in object detection using an image. An information processing apparatus according to an aspect of the present invention comprising one or more hardware processors, and one or more memories storing one or more programs configured to be executed by the one or more hardware processors, the one or more programs including instructions to detect an object relating to a plurality of attributes from an image, determine overlapping of detection results for different attributes on detection results, extract a second image from the first image based on a determination result relating to the detection results of object detection on the first image, and correct the detection results of object detection based on the detection results of object detection on the second image extracted from the first image.

Further features of the present invention will become apparent from the following description of exemplary embodiments with reference to the attached drawings.

BRIEF DESCRIPTION I/F THE DRAWINGS

FIG. 8C illustrates an example of an image obtained in object detection processing according to the second exemplary embodiment.

FIG. 8D illustrates an example of a transformed detection result in object detection processing according to the second exemplary embodiment.

FIG. 8E illustrates an example of an image obtained in object detection processing according to the second exemplary embodiment.

FIG. 11A illustrates an example of detection results in object detection processing according to the third exemplary embodiment.

FIG. 11B illustrates object detection processing according to the third exemplary embodiment.

FIG. 11C illustrates object detection processing according to the third exemplary embodiment.

DESCRIPTION I/F THE EMBODIMENTS

Exemplary embodiments of the present invention will be described below with reference to the drawings.

First Exemplary Embodiment

Figure 1:
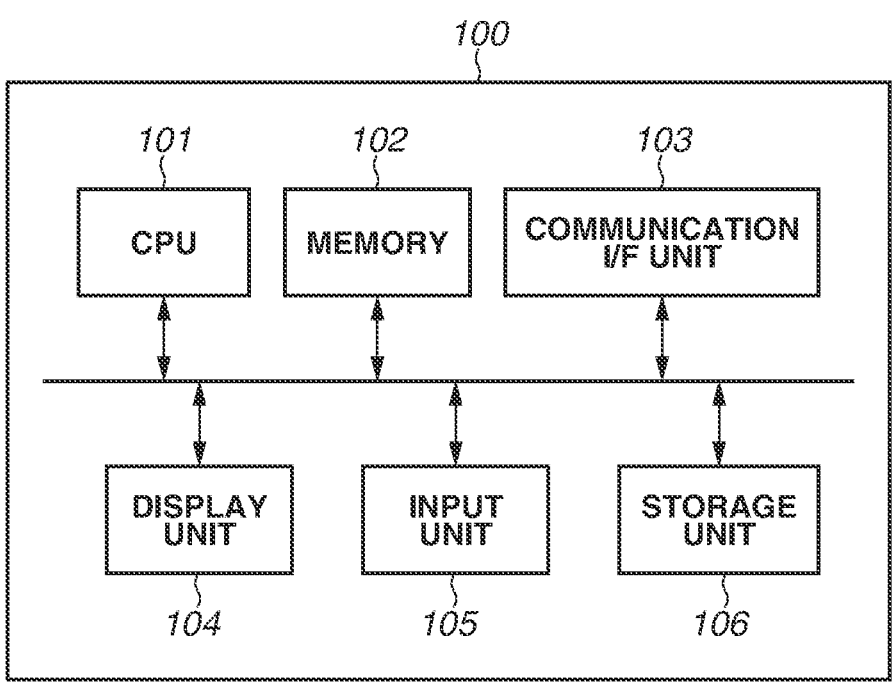
FIG. 1 is a block diagram illustrating a configuration example of an information processing apparatus according to a first exemplary embodiment.

FIG. 1 is a block diagram illustrating a configuration example of an information processing apparatus 100 according to a first exemplary embodiment. The information processing apparatus 100 according to the first exemplary embodiment includes an object detection function for detecting a detection target object from an image captured by an imaging device such as a monitoring camera. The first exemplary embodiment to be described below illustrates an example where the face of a person is detected. However, the present exemplary embodiment is not limited to this example. The present exemplary embodiment can be applied to any system for analyzing an image to detect a predetermined object.

The information processing apparatus 100 according to the present exemplary embodiment includes a central processing unit (CPU) 101, a memory 102, a communication interface (IF) unit 103, a display unit 104, an input unit 105, and a storage unit 106. The CPU 101, the memory 102, the communication I/F unit 103, the display unit 104, the input unit 105, and the storage unit 106 are communicably connected via a system bus. The information processing apparatus 100 according to the present exemplary embodiment may further include components other than the components described above.

The CPU 101 controls the overall operation of the information processing apparatus 100. The CPU 101 controls, for example, operations of functional units connected via the system bus. The memory 102 stores data, programs, and the like to be used by the CPU 101 to execute processing. The memory 102 functions as a main memory, a work area, or the like for the CPU 101. The CPU 101 executes processing based on programs stored in the memory 102, to thereby implement the functional configuration of the information processing apparatus 100 illustrated in FIG. 2 as described below and implement processing in a flowchart illustrated in FIG. 3 as described below.

The communication I/F unit 103 is an interface for connecting the information processing apparatus 100 to a network. The display unit 104 includes a display member such as a liquid crystal display, and displays results of processing executed by the CPU 101 and the like. The input unit 105 includes an operation member such as a mouse or buttons, and inputs a user operation to the information processing apparatus 100. The storage unit 106 stores, for example, various data and the like to be used by the CPU 101 to execute processing based on programs. The storage unit 106 stores, for example, various data obtained as a result of the CPU 101 executing processing based on programs. The storage unit 106 may also store data, programs, and the like to be used by the CPU 101 to execute processing.

Figure 2:
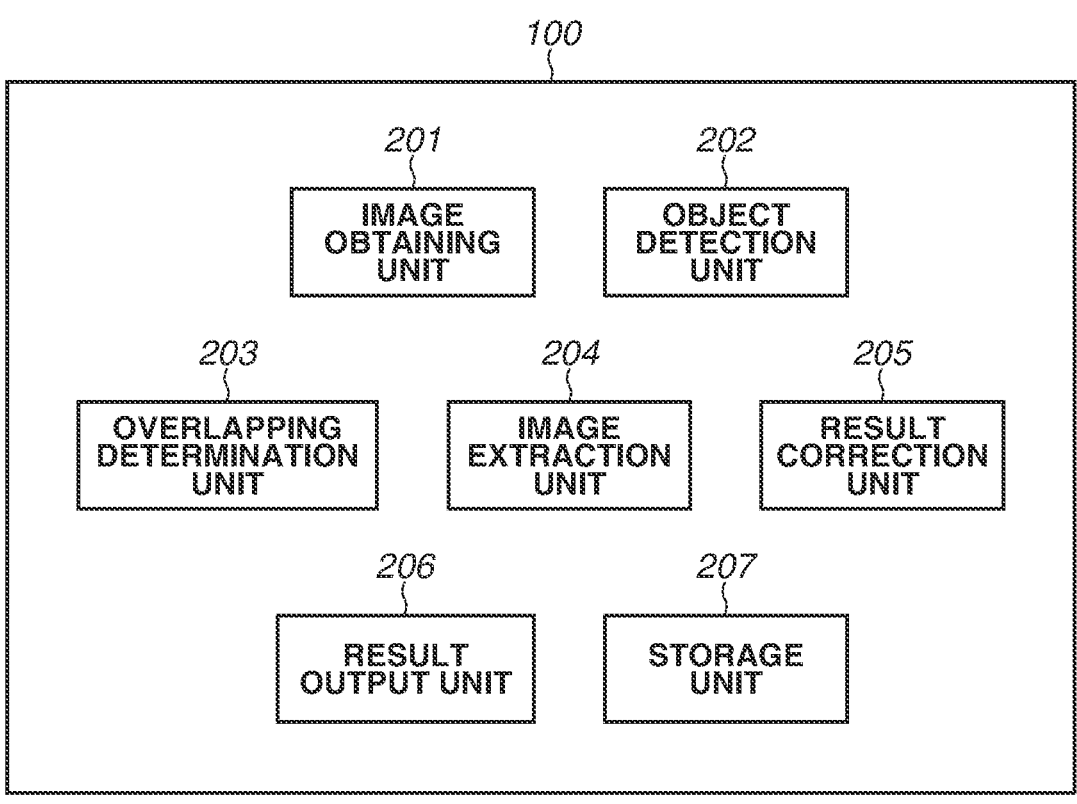
FIG. 2 is a block diagram illustrating a functional configuration example of the information processing apparatus according to the first exemplary embodiment.

FIG. 2 is a block diagram illustrating a functional configuration example of the information processing apparatus 100. The information processing apparatus 100 includes an image obtaining unit 201, an object detection unit 202, an overlapping determination unit 203, an image extraction unit 204, a result correction unit 205, a result output unit 206, and a storage unit 207.

The image obtaining unit 201 obtains an image on which object detection is to be performed. In the present exemplary embodiment, the image on which object detection is to be performed is obtained from an external device via the communication I/F unit 103. Data of the object detection target data obtained by the image obtaining unit 201 is hereinafter also referred to simply as an "input image". In the present exemplary embodiment to be described below, for example, a red, green, and blue (RGB) image of 1080× 720 pixels with a width in a horizontal direction (lateral direction) of 1080 pixels and a height in a vertical direction (longitudinal direction) of 720 pixels is used as an input image. The input image is not limited to an RGB image of 1080×720 pixels. Any image can be used as the input image. For example, images with various widths in the horizontal direction and various heights in the vertical direction may be used.

The object detection unit 202 detects an object relating to a plurality of attributes (classes) from an image. In the present exemplary embodiment, the object detection unit 202 detects the face of a person from an image obtained by the image obtaining unit 201. The object detection unit 202 outputs detection results using a machine learning model trained to detect a "face wearing glasses" and a "face not wearing glasses" included in the image. The detection of the "face wearing glasses" and the "face not wearing glasses" can be implemented by applying a technique discussed in, for example, J. Redmon, A. Farhadi, "YOLO9000: Better Faster Stronger", Computer Vision and Pattern Recognition (CVPR) 2016.

Assume herein that the detection results output from the object detection unit 202 include the position and size of each detected face, an attribute (class) of each detected face, and a reliability of detection. The position and size of each detected face are output as, for example, coordinates (e.g., upper left coordinates (x1, y1) and lower right coordinates (x2, y2) of a rectangular frame) that define a rectangular frame surrounding each face. A face attribute indicates a face wearing glasses or a face not wearing glasses. The reliability of detection is output as real numbers 0 to 1, for example, assuming that a lowest reliability is "0" and a highest reliability is "1". A rectangular frame surrounding each face is hereinafter also referred to as a "detection frame". A face attribute is hereinafter also referred to as an "attribute". The reliability of detection is hereinafter also referred to as "reliability". The method for outputting detection results is not limited to the above-described example. Any method may be used, as long as the position and size of each detected face, the attribute of each detected face, and the reliability of detection can be recognized.

The overlapping determination unit 203 determines overlapping of detection results for different attributes on the detection results obtained by the object detection unit 202. The overlapping determination unit 203 calculates an overlapping ratio for each pair of detection frames arbitrarily selected from all the detection results obtained by the object detection unit 202. If the calculated overlapping ratio is more than or equal to a threshold, or if there is a pair of detection frames overlapping with a predetermined ratio or more, the overlapping determination unit 203 determines that the detection results corresponding to the detection frames overlap, and outputs the pair of the detection results. In the present exemplary embodiment, the overlapping ratio is calculated by Intersection over Union (IoU), and the threshold is, for example, "0.5". Specifically, if the quotient obtained by dividing a common area between the areas of two detection frames by the sum set of the areas is 0.5 or greater, the overlapping determination unit 203 determines that the detection frames overlap. If there is no pair of detection frames overlapping by the threshold or more, the overlapping determination unit 203 determines that the detection frames do not overlap.

The image extraction unit 204 extracts a designated area from an input image using the input image and the pair of detection results determined to overlap by the overlapping determination unit 203 based on a determination result from the overlapping determination unit 203. The image extraction unit 204 outputs an image of the extracted area (hereinafter also referred to as an "extracted image") and the upper left coordinates of the extracted area on the input image. In the present exemplary embodiment, the upper left coordinates of the extracted area are calculated as (x1−((x2−x1)/10), y1−((y2−y1)/10)) and the lower right coordinates of the extracted area are calculated as (x2+((x2−x1)/10), y2+((y2−y1)/10)), and the area with a margin around the area corresponding to the sum set of the areas is extracted. The image extraction unit 204 outputs the extracted image and the upper left coordinates (x1−((x2−x1)/10), y1−((y2−y1)/10)) of the area to be extracted. In this case, (x1, y1) represents the upper left coordinates of the rectangular area including the sum set of two detection frames, and (x2, y2) represents the lower right coordinates of the rectangular area including the sum set of two detection frames. If the area to be extracted does not fall within the range of the input image, the area outside of the range of the input image is painted, for example, in white.

The result correction unit 205 reflects detection results from the object detection unit 202 on the extracted image in detection results on the input image depending on the number of detection results on the extracted image. First, the result correction unit 205 deletes the detection results used to calculate the extracted area from the detection results on the input image. Next, if the number of detection results on the extracted image is one, the result correction unit 205 replaces the detection result with the detection result obtained in the extracted image. If the number of detection results on the extracted image is two or more, the result correction unit 205 generates a detection result that is represented by a detection frame corresponding to a rectangular area including the sum set of two detection results and includes a face attribute indicating "unknown whether glasses are worn" and the reliability of detection "1", and then replaces the detection results with the generated detection result.

The result output unit 206 outputs an image obtained by superimposing the detection results on the input image. In the present exemplary embodiment, the result output unit 206 outputs, for example, an image obtained by superimposing detection frames depending on the attributes on the input image based on the detection results. The storage unit 207 stores data to be used for processing in the functional units 201 to 206 of the information processing apparatus 100, data obtained as processing results, and the like.

Figure 3:
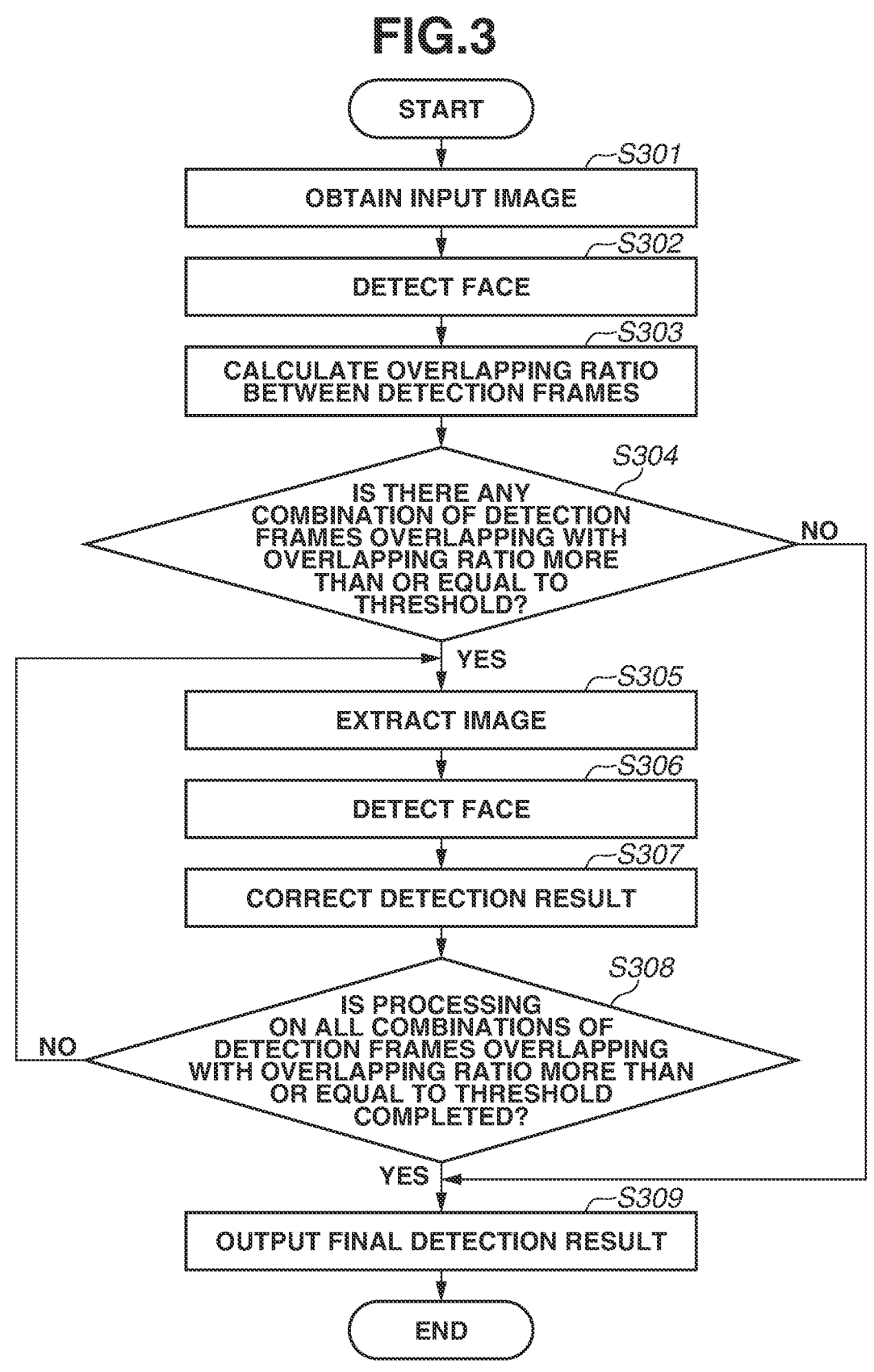
FIG. 3 is a flowchart illustrating object detection processing according to the first exemplary embodiment.

Next, processing to be performed by the information processing apparatus 100 will be described with reference to FIG. 3 and FIGS. 4A to 4H. FIG. 3 is a flowchart illustrating object detection processing according to the first exemplary embodiment. FIGS. 4A to 4H each illustrate object detection processing according to the first exemplary embodiment.

Figures 4A, 4B:
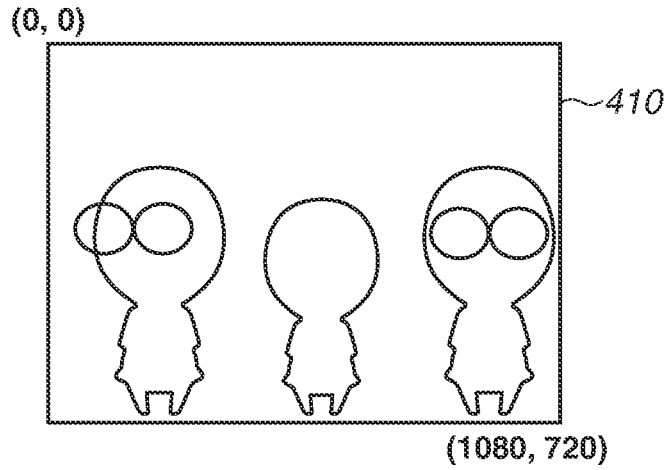
FIG. 4A illustrates an example of an input image obtained in object detection processing according to the first exemplary embodiment.
FIG. 4B illustrates an example of detection results in object detection processing according to the first exemplary embodiment.

In step S301, the image obtaining unit 201 obtains an input image (image on which object detection is performed). FIG. 4A illustrates an example of an input image 410. In the present exemplary embodiment, an image of 1080×720 pixels as described above is used as the input image 410.

Figure 4C:
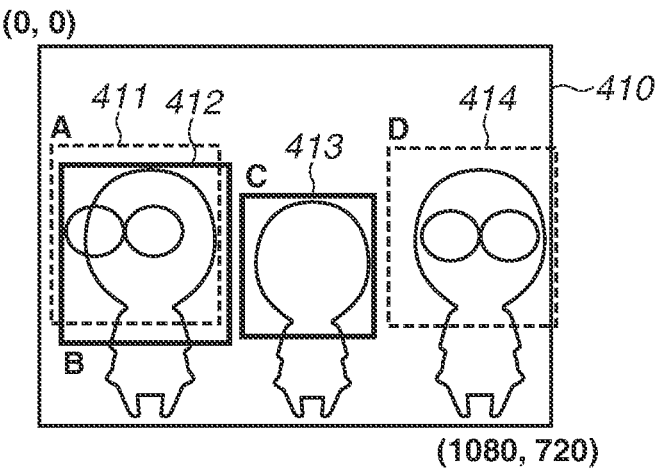
FIG. 4C illustrates an example of an image obtained in object detection processing according to the first exemplary embodiment.

In step S302, the object detection unit 202 performs face detection processing for detecting the face of a person to be detected using the input image, and detects "faces wearing glasses" and "faces not wearing glasses" from the input image. FIG. 4B illustrates an example of detection results in face detection processing on the input image. FIG. 4C illustrates an example of an image obtained by superimposing the detection results on the input image. In the example illustrated in FIG. 4B, four detection results A to D are obtained as the detection results, and the upper left coordinates (x1, y1) and the lower right coordinates (x2, y2) of each detection frame, the attribute ("wearing glasses" or "not wearing glasses"), and the reliability are output. In the example illustrated in FIG. 4C, detection frames 411 to 414 corresponding to the detection results A to D, respectively, are superimposed on the input image 410 to be displayed. In this example, the detection frames 411 and 414 corresponding to the detection results A and D, respectively, which are detected as "faces wearing glasses", are displayed as dashed-line rectangular frames, and the detection frames 412 and 413 corresponding to the detection results B and C, respectively, which are detected as "faces not wearing glasses", are displayed as solid-line rectangular frames.

In step S303, the overlapping determination unit 203 calculates the overlapping ratio between detection frames for each pair of detection results on the input image using two detection results arbitrarily selected from the detection results on the input image as a pair of detection results. In this example, the upper left coordinates of the detection frame corresponding to the detection result A are (20, 200) and the lower right coordinates of the detection frame corresponding to the detection result A are (320, 500). The upper left coordinates of the detection frame corresponding to the detection result B are (40, 210) and the lower right coordinates of the detection frame corresponding to the detection result B are (340, 510). Accordingly, the overlapping ratio between detection frames corresponding to the detection result A and the detection result B, respectively, is calculated as IoU (A, B)=((320−40)× (500−210))÷(300× 300+300×300−((320−40)× (500−210)))≈0.82. The overlapping ratio between detection frames in the other combinations of detection frames is "0".

In step S304, the overlapping determination unit 203 determines whether there is a combination of detection results overlapping with the overlapping ratio calculated in step S303 being more than or equal to a threshold. If the overlapping determination unit 203 determines that there is a combination of detection results overlapping with the overlapping ratio more than or equal to the threshold (YES in step S304), the overlapping determination unit 203 outputs the combination of detection results overlapping with the overlapping ratio more than or equal to the threshold, and then the processing proceeds to step S305. On the other hand, if the overlapping determination unit 203 determines that there is no combination of detection results overlapping with the overlapping ratio more than or equal to the threshold (NO in step S304), the processing proceeds to step S309. In the present exemplary embodiment, assume that the threshold for the overlapping ratio is 0.5. If the overlapping determination unit 203 determines that there is a combination of detection results overlapping with the overlapping ratio calculated in step S303 being more than or equal to 0.5 (YES in step S304), the processing proceeds to step S305. If the overlapping determination unit 203 determines that there is no combination of detection results overlapping with the overlapping ratio more than or equal to 0.5 (NO in step S304), the processing proceeds to step S309. In this example, since the overlapping ratio between the detection frames corresponding to the detection result A and the detection result B, respectively, is more than or equal to 0.5, the overlapping determination unit 203 outputs the combination (A, B) of detection results overlapping with the overlapping ratio of 0.5 or more, and then the processing proceeds to step S305.

Figure 4D:
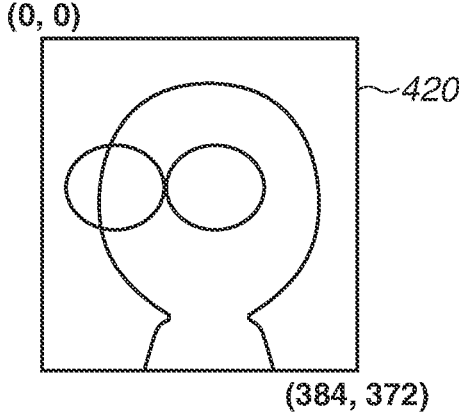
FIG. 4D illustrates an example of an extracted image obtained in object detection processing according to the first exemplary embodiment.

In step S305, the image extraction unit 204 extracts a designated area from the input image using the input image and the pair of detection results output in step S304, and outputs the extracted image and the upper left coordinates of the area to be extracted on the input image. Specifically, first, the image extraction unit 204 calculates a rectangle circumscribed about the sum set of two detection frames based on the pair of detection results. In this example, the circumscribed rectangle is calculated for the combination (A, B). As illustrated in FIG. 4B, the upper left coordinates of the detection frame corresponding to the detection result A are (20, 200), the lower right coordinates of the detection frame corresponding to the detection result A are (320, 500), the upper left coordinates of the detection frame corresponding to the detection result B are (40, 210), and the lower right coordinates of the detection frame corresponding to the detection result B are (340, 510). Accordingly, the upper left coordinates of the circumscribed rectangle for the combination (A, B) are (20, 200) and the lower right coordinates of the circumscribed rectangle for the combination (A, B) are (340, 510). Next, the image extraction unit 204 calculates the upper left coordinates and the lower right coordinates of the area to be extracted based on the calculated circumscribed rectangle. In this example, the upper left coordinates of the circumscribed rectangle for the combination (A, B) are (20, 200), and the lower right coordinates of the circumscribed rectangle for the combination (A, B) are (340, 510). Accordingly, the upper left coordinates of the area to be extracted are calculated as (20−((340−20)/10), (200−((510-200)/10))=(−12, 169). The lower right coordinates of the area to be extracted are calculated as (340+ ((340−20)/10), 510+((510−200)/10))=(372, 541). The upper left coordinates of the area to be extracted are (−12, 169), and the lower right coordinates of the area to be extracted are (372, 541). The width in the horizontal direction of the extracted image corresponds to 384 pixels, and the height in the vertical direction of the extracted image corresponds to 372 pixels. FIG. 4D illustrates an example of an extracted image 420 obtained as described above.

Figures 4E, 4F:
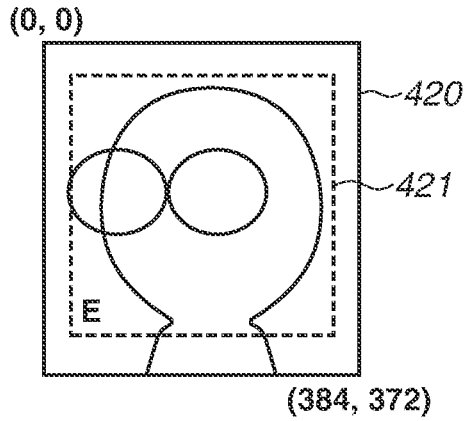
FIG. 4E illustrates an example of detection results in object detection processing according to the first exemplary embodiment.
FIG. 4F illustrates an example of an image obtained in object detection processing according to the first exemplary embodiment.

In step S306, the object detection unit 202 performs face detection processing using the extracted image extracted in step S305, and detects "faces wearing glasses" and "faces not wearing glasses" from the extracted image. FIG. 4E illustrates an example of detection results in face detection processing on the extracted image. FIG. 4F illustrates an example of an image obtained by superimposing the detection results on the extracted image. In the example illustrated in FIG. 4E, a detection result E is obtained, and the upper left coordinates (x1, y1) and the lower right coordinates (x2, y2) of the detection frame, the attribute, and the reliability are output. In the example illustrated in FIG. 4F, a detection frame 421 corresponding to the detection result E detected as a "face wearing glasses" is superimposed on the extracted image 420 to be displayed as a dashed-line rectangular frame.

Figures 4G, 4H:
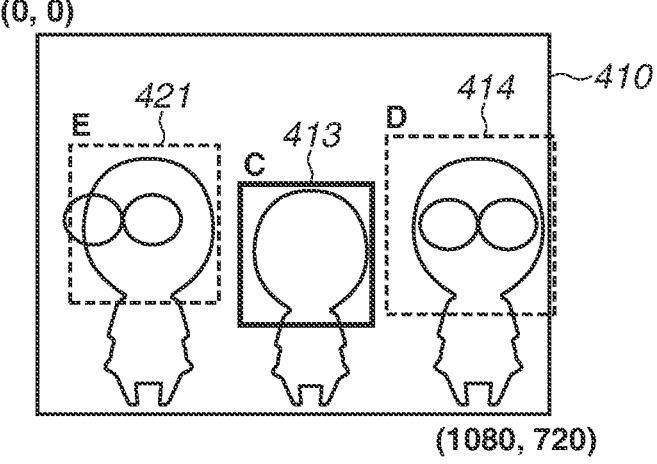
FIG. 4G illustrates an example of a final result obtained in object detection processing according to the first exemplary embodiment.
FIG. 4H illustrates an example of an image obtained in object detection processing according to the first exemplary embodiment.

In step S307, the result correction unit 205 reflects detection results on the extracted image obtained in step S306 in detection results on the input image. In this example, only one detection result (detection result E in this case) on the extracted image is obtained. Accordingly, the result correction unit 205 deletes the detection result A and the detection result B that are associated with the extracted image, and replaces the detected detection results A and B with the detection result E on the extracted image. In this case, the coordinates of the detection frame corresponding to the detection result E are transformed into the coordinates on the input image based on the upper left coordinates (−12, 169) of the area to be extracted on the input image. The upper left coordinates of the detection frame corresponding to the detection result E on the extracted image are (42, 36) and the lower right coordinates of the detection frame corresponding to the detection result E are (342, 336). Accordingly, the upper left coordinates of the detection frame corresponding to the detection result E on the input image are (30, 205) and the lower right coordinates of the detection frame corresponding to the detection result E are (330, 505). FIG. 4G illustrates an example of a final detection result of the input image including the transformed detection result.

In step S308, the result output unit 206 determines whether the processing on all combinations of detection results overlapping with the overlapping ratio more than or equal to the threshold is completed. If the result output unit 206 determines that the processing on all combinations of detection results overlapping with the overlapping ratio more than or equal to the threshold is completed (YES in step S308), the processing proceeds to step S309. On the other hand, if the result output unit 206 determines that the processing on all combinations of detection results overlapping with the overlapping ratio more than or equal to the threshold is not completed (NO in step S308), the processing returns to step S305 to execute the processing of step S305 and subsequent steps on the combination of detection results on which the processing has not been executed.

In step S309, the result output unit 206 outputs the image obtained by superimposing the final detection result for the input image as illustrated in FIG. 4G on the input image. Then, the processing on the current input image is terminated, and the processing on the next input image is started. FIG. 4H illustrates an example of the image obtained by superimposing the final detection result for the input image on the input image. In the example illustrated in FIG. 4H, the detection frames 413, 414, and 421 corresponding to the detection results C, D, and E, respectively, are superimposed on the input image 410 to be displayed. In this example, the detection frames 414 and 421 corresponding to the detection results D and E, respectively, which are detected as "faces wearing glasses", are displayed as dashed-line rectangular frames, and the detection frame 413 corresponding to the detection result C detected as a "face not wearing glasses" is displayed as a solid-line rectangular frame.

According to the first exemplary embodiment, if detection results for different attributes overlap in object detection on an input image, object detection is performed on an extracted image obtained by extracting the area where the detection results overlap, and the detection results on the input image are corrected using the detection results on the extracted image. Consequently, a more appropriate detection result can be finally output as the detection result of object detection on the input image.

Modified Examples

The object detection unit 202 may use various types of objects to be detected and may perform object detection on images of various sizes. The object detection technique for the object detection unit 202 is not limited to the technique discussed in Japanese Patent Application Laid-Open No. 2018-180945, but also various techniques can be used as long as an object to be detected can be detected. If the overlapping determination unit 203 uses three or more types of objects to be detected, the above-described overlapping determination technique can be applied to any combination of two types of detection results.

If the number of detection results on the extracted image is two or more, the result correction unit 205 may perform not only the above-described processing, but also other processing as described below. For example, an attribute of a face indicated by a detection result with a highest reliability of detection may be used as the face attribute. Alternatively, the detection result (detection frame, attribute, and reliability) itself may be replaced with the detection result with the highest reliability of detection. In this case, the detection result with the highest reliability may be selected from among the detection results on the input image and the detection results on the detection result.

Any rectangular area may be used as the area to be extracted by the image extraction unit 204, as long as the rectangular area includes the sum set of detection frames. For example, the margin around the area corresponding to the circumscribed rectangle for the sum set of detection frames may be "0", or a predetermined margin may be set based on the specifications of the object detection unit 202. For example, if the ratio of the lateral width of the object to the lateral width of the input image at which the highest detection accuracy of the object detection unit 202 can be obtained is 50%, the margin may be set such that the width of the rectangular area including the sum set of detection frames is 50% of the width of the input image. The image extraction unit 204 may be configured to not only extract a designated area from the input image, but also perform horizontal flip of an image with respect to the extracted image, shift the image in an x-direction or a y-direction, or change a pixel value representing a luminance, hue, or the like.

If the detection results on the input image overlap, second detection processing is not carried out (in other words, the processing of steps S305 and S306 is skipped), and the result correction unit 205 may directly generate a detection result and may replace the generated detection result with the overlapping detection results. For example, the result correction unit 205 may generate a detection result that is represented by a rectangular area including the sum set of overlapping detection frames as a new detection frame, and includes a face attribute indicating "unknown whether glasses are worn" and the reliability of detection "1", and may replace the overlapping detection results with the generated detection result. Further, if there is no detection result on the extracted image, the result correction unit 205 may directly generate a detection result and may replace the overlapping detection results with the generated detection result.

Second Exemplary Embodiment

In the first exemplary embodiment described above, object detection processing is performed by one information processing apparatus. In a second exemplary embodiment, a case where object detection processing is performed by a plurality of information processing apparatus will be described. In the second exemplary embodiment to be described below, descriptions of components similar to those of the first exemplary embodiment are omitted.

Figure 5:
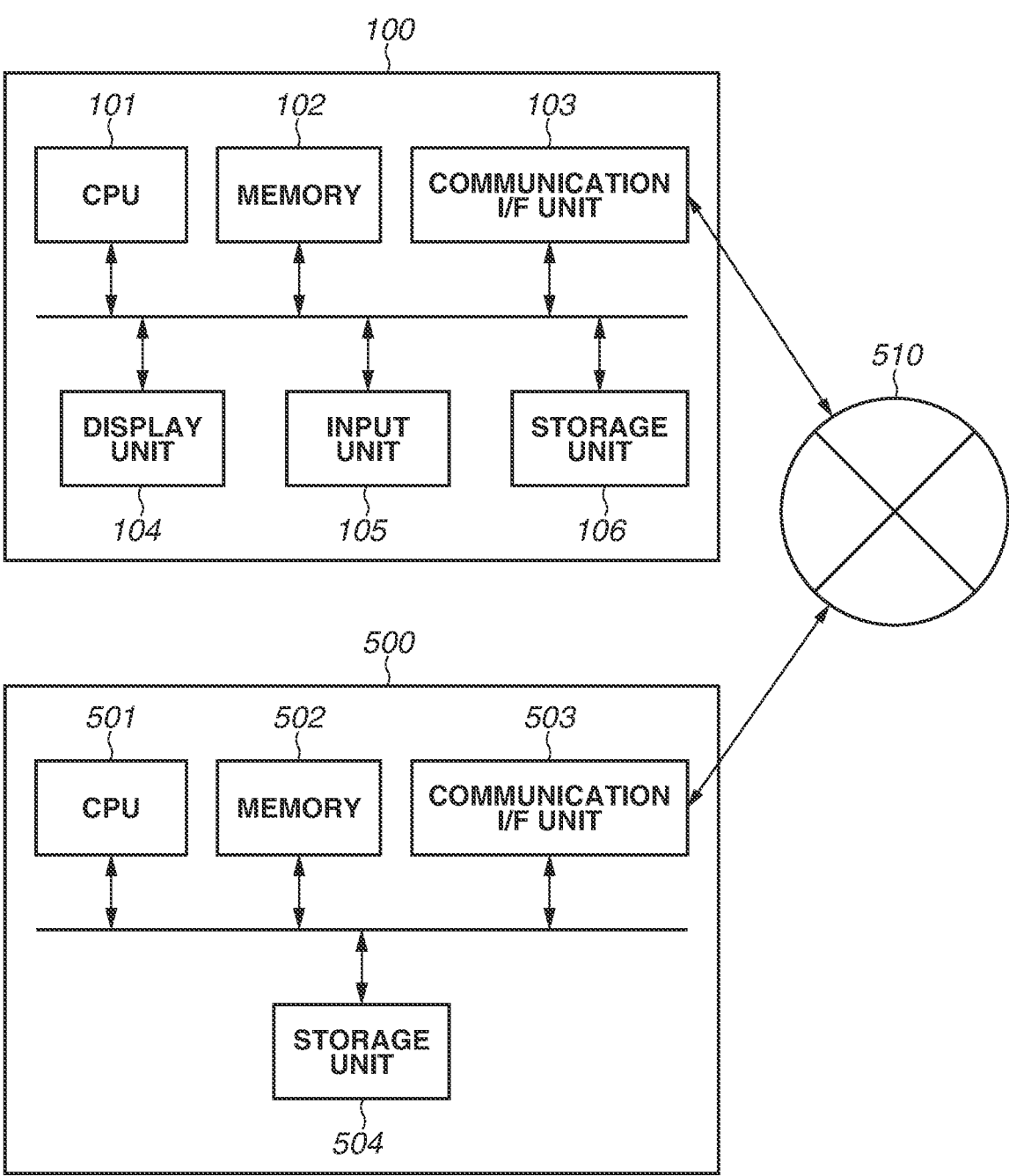
FIG. 5 is a block diagram illustrating a configuration example of an information processing apparatus according to a second exemplary embodiment.

FIG. 5 is a block diagram illustrating a configuration example of an information processing system including the information processing apparatus 100 and an information processing apparatus 500 according to the second exemplary embodiment. Components in FIG. 5 having the same functions as those of the components illustrated in FIG. 1 are denoted by the same reference numerals, and redundant descriptions are omitted. The information processing apparatus 100 and the information processing apparatus 500 according to the second exemplary embodiment include an object detection function for detecting a target object to be detected from an image captured by an imaging device such as a monitoring camera. The second exemplary embodiment to be described below illustrates an example where the face of a person is detected. However, the present exemplary embodiment is not limited to this example. The present exemplary embodiment can be applied to any system for analyzing an image to detect a predetermined object.

The information processing apparatus 100 and the information processing apparatus 500 are connected via a network 510. The information processing apparatus 500 includes a CPU 501, a memory 502, a communication I/F unit 503, and a storage unit 504. The CPU 501, the memory 502, the communication I/F unit 503, and the storage unit 504 are communicably connected via a system bus. The information processing apparatus 500 according to the present exemplary embodiment may further include components other than the components described above. The information processing apparatus 100 is an example of a first information processing apparatus, and the information processing apparatus 500 is an example of a second information processing apparatus. The communication I/F unit 103 is an example of a first communication unit, and the communication I/F unit 503 is an example of a second communication unit.

The CPU 501 controls the overall operation of the information processing apparatus 500. The CPU 501 controls, for example, operations of functional units connected via the system bus. The memory 502 stores data, programs, and the like to be used by the CPU 501 to execute processing. The memory 502 functions as a main memory, a work area, or the like for the CPU 501. The CPU 501 executes processing based on programs stored in the memory 502, to thereby implement the functional configuration of the information processing apparatus 500 illustrated in FIG. 6 as described below and implement some of processing in a flowchart illustrated in FIG. 7 as described below.

The communication I/F unit 503 is an interface for connecting the information processing apparatus 500 to the network 510. The storage unit 504 stores various data and the like to be used for, for example, the CPU 501 to execute processing based on programs. The storage unit 504 also stores various data and the like obtained, for example, by the CPU 501 performing processing based on programs. Data, programs, and the like to be used by the CPU 501 to execute processing may be stored in the storage unit 504.

Figure 6:
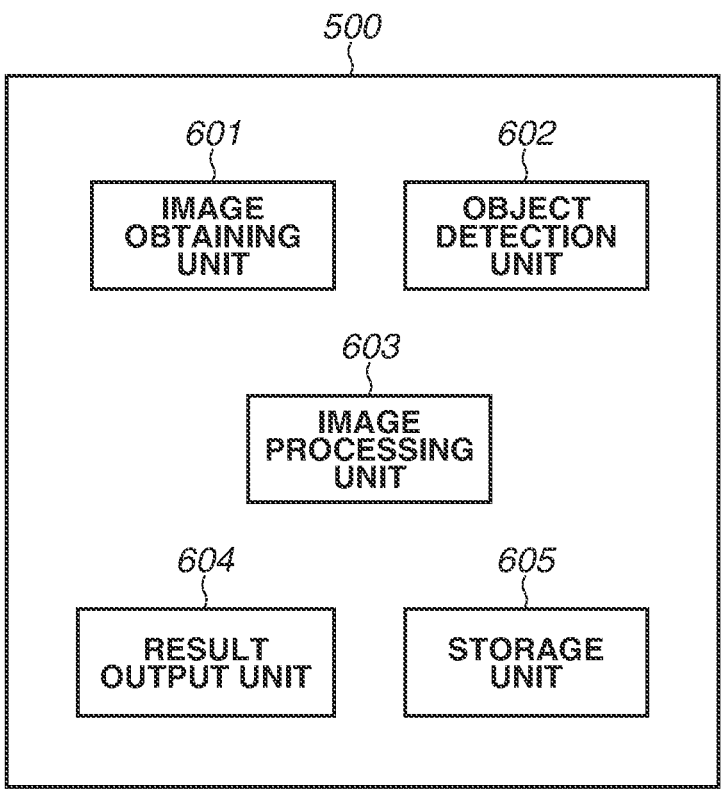
FIG. 6 is a block diagram illustrating a functional configuration example of the information processing apparatus according to the second exemplary embodiment.

FIG. 6 is a block diagram illustrating a functional configuration example of the information processing apparatus 500. The information processing apparatus 500 includes an image obtaining unit 601, an object detection unit 602, an image processing unit 603, a result output unit 604, and a storage unit 605.

The image obtaining unit 601 obtains an image on which object detection is performed. In the present exemplary embodiment, the information processing apparatus 500 uses an extracted image as the image on which object detection is performed, and the image obtaining unit 601 obtains the extracted image from the information processing apparatus 100 through the communication I/F unit 603 via the network 510.

The object detection unit 602 detects an object relating to a plurality of attributes (classes) from an image. The object detection unit 602 detects "faces wearing glasses" and "faces not wearing glasses" included in the extracted image in the same manner as in the object detection unit 202. In the present exemplary embodiment, the object detection unit 602 detects an object from, for example, an RGB image of 448×448 pixels with a width in the horizontal direction (lateral direction) of 448 pixels and a height in the vertical direction (longitudinal direction) of 448 pixels. The other configuration of the object detection unit 602 is similar to that of the object detection unit 202.

The image processing unit 603 modifies the shape of the extracted image into a designated size, and outputs the modified image and modification magnifications in the longitudinal and lateral directions. A generally-known technique, such as a bicubic method, can be used as an algorithm for modifying the shape of an image. Further, a super-resolution technique may be used to enlarge an image. In the present exemplary embodiment, the image processing unit 603 modifies the shape of the extracted image into an image of 448×448 pixels. In this case, when the width of the extracted image is represented by w pixels and the height of the extracted image is represented by h pixels, the modification magnification in the longitudinal direction is (448/w) and the modification magnification in the lateral direction is (448/h).

The result output unit 604 corrects the detection frame corresponding to the detection result output from the object detection unit 602 to the coordinates on the extracted image before modification using the modification magnifications output from the image processing unit 603, and outputs the corrected coordinates. In the present exemplary embodiment, when the modification magnifications in the longitudinal and lateral directions are represented by wm and hm, respectively, for the detection frame represented by the upper left coordinates (x1, y1) and the lower right coordinates (x2, y2), the corrected upper left coordinates are represented by (x1/wm, y1/hm) and the corrected lower right coordinates are represented by (x2/wm, y2/hm). The storage unit 605 stores data to be used for processing in the functional units 601 to 604 of the information processing apparatus 500, data obtained as processing results, and the like.

Figure 7:
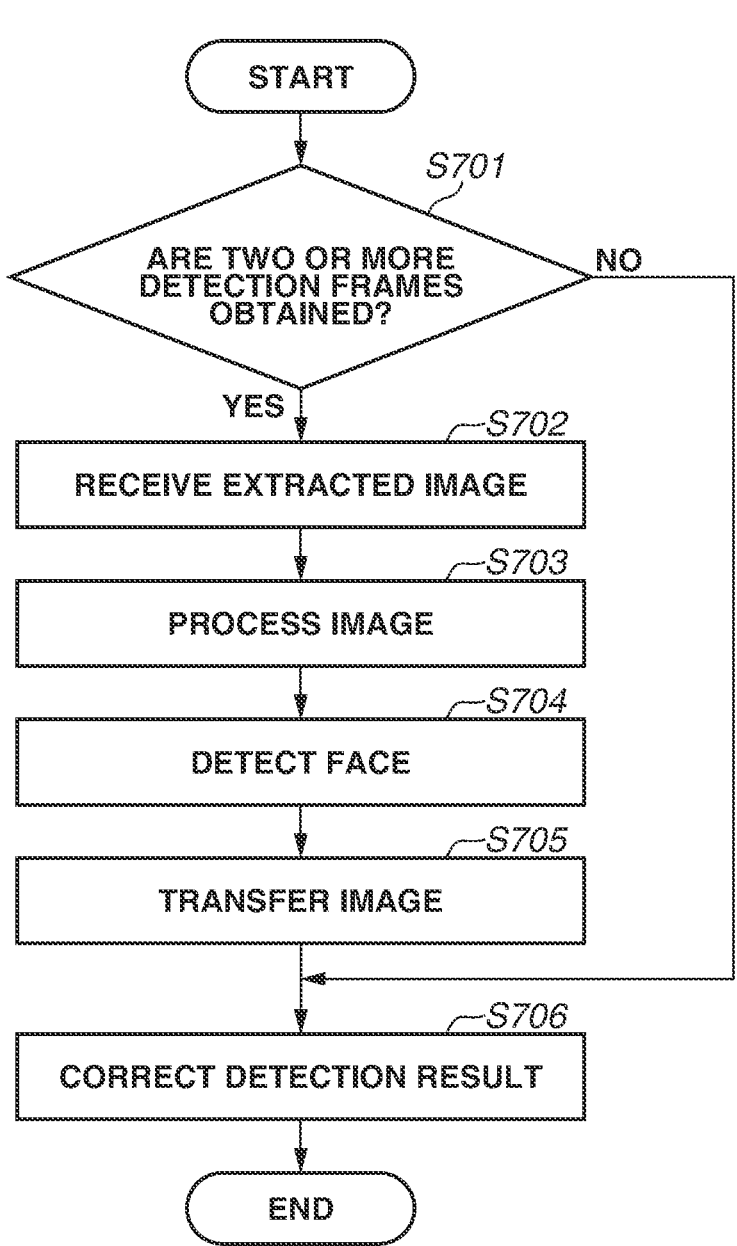
FIG. 7 is a flowchart illustrating object detection processing according to the second exemplary embodiment.

Next, processing to be performed by the information processing apparatus 100 and 500 will be described with reference to FIGS. 3, 7, and 8A to 8E. FIG. 7 is a flowchart illustrating object detection processing according to the second exemplary embodiment. FIGS. 8A to 8E each illustrate processing in the flowchart illustrated in FIG. 7.

The processing of steps S301 to S306 illustrated in FIG. 3 and the processing of steps S308 and S309 in the object detection processing according to the second exemplary embodiment are similar to those in the object detection processing according to the first exemplary embodiment. The object detection processing according to the second exemplary embodiment differs from the object detection processing according to the first exemplary embodiment in regard to the processing of step S307 illustrated in FIG. 3. A detailed processing flow of processing corresponding to the processing of step S307 illustrated in FIG. 3 according to the second exemplary embodiment will be described with reference to FIG. 7.

In step S701, the result correction unit 205 of the information processing apparatus 100 determines whether the number of detection results on the extracted image obtained in step S306 is two or more. If the result correction unit 205 determines the number of detection results on the extracted image is two or more (YES in step S701), the processing proceeds to step S702. If the result correction unit 205 determines that the number of detection results on the extracted image is less than two (NO in step S701), the processing proceeds to step S706.

Figures 8A, 8B:
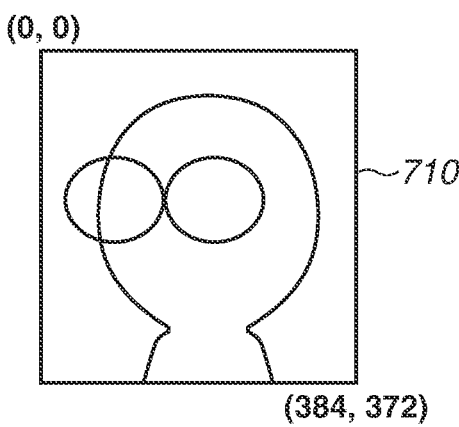
FIG. 8A illustrates an example of an extracted image in object detection processing according to the second exemplary embodiment.
FIG. 8B illustrates an example of a detection result in object detection processing according to the second exemplary embodiment.

In step S702, the image obtaining unit 601 of the information processing apparatus 500 receives the extracted image from the information processing apparatus 100. FIG. 8A illustrates an example of a received extracted image 710. In this example, the extracted image 710 is similar to the extracted image 420 illustrated in FIG. 4D according to the first exemplary embodiment. An image having a width in the horizontal direction of 384 pixels and a height in the vertical direction of 372 pixels is used.

In step S703, the image processing unit 603 of the information processing apparatus 500 modifies the shape of the extracted image received in step S702 into a predetermined size, and outputs the modified image and modification magnifications in the longitudinal and lateral directions. In this example, the image processing unit 603 modifies the shape of the extracted image of 384×372 pixels received in step S702 into an image of 448×448 pixels. Accordingly, the modification magnification in the longitudinal direction is (448/384) and the modification magnification in the lateral direction is (448/372).

In step S704, the object detection unit 602 of the information processing apparatus 500 performs face detection processing using the modified extracted image, and detects "faces wearing glasses" and "faces not wearing glasses" from the modified extracted image. FIG. 8B illustrates an example of a detection result of face detection processing on the modified extracted image. FIG. 8C illustrates an example of an image obtained by superimposing the detection result on the modified extracted image. In the example illustrated in FIG. 8B, one detection result F is obtained, and the upper left coordinates (x1, y1) and the lower right coordinates (x2, y2) of the detection frame, the attribute, and the reliability are output. The coordinates of the detection frame illustrated in FIG. 8B correspond to the coordinates on the modified extracted image. In the example illustrated in FIG. 8C, a detection frame 721 corresponding to the detection result F detected as a "face wearing glasses" is superimposed on a modified extracted image 720 to be displayed as a dashed-line rectangular frame.

In step S705, the result output unit 606 of the information processing apparatus 500 corrects the coordinates of the detection frame corresponding to the detection result output in step S704 to the coordinates on the extracted image before modification using the modification magnifications in the longitudinal and lateral directions, and outputs the corrected coordinates. Specifically, the result output unit 606 transforms the coordinates of the detection frame on the modified image of 448×448 pixels into the coordinates on the image of 384×372 pixels before modification using modification magnifications 448/384 and 448/372 in the longitudinal and lateral directions, respectively, and outputs the transformed coordinates to the information processing apparatus 100. FIG. 8D illustrates an example of the transformed detection result. FIG. 8E illustrates an example of an image obtained by superimposing the detection result on the extracted image of 384×372 pixels. In the example illustrated in FIG. 8D, the upper left coordinates (x1, y1) and the lower right coordinates (x2, y2) of the detection frame corresponding to the detection result F are transformed based on the modification magnifications, respectively. In the example illustrated in FIG. 8E, a detection frame 711 corresponding to the detection result F detected as a "face wearing glasses" is superimposed on the extracted image 710 before modification to be displayed as a dashed-line rectangular frame.

In step S706, the result correction unit 205 of the information processing apparatus 100 reflects the detection result on the extracted image output from the result output unit 604 of the information processing apparatus 500 in step S705 in the detection result on the input image. In this example, since only one detection result (detection result F in this case) is obtained for the extracted image, the result correction unit 205 deletes the detection result A and the detection result B that are associated with the extracted image, and replaces the detection results A and B with the detection result F on the extracted image.

According to the second exemplary embodiment, if detection results for different attributes overlap in object detection, object detection is performed on the image of the area where the detection results overlap and the detection results on the input image are corrected using the detection result. Consequently, a more appropriate detection result can be finally output as the detection result of object detection on the input image.

Modified Examples

In the present exemplary embodiment, the two information processing apparatus 100 and 500 are connected via the network 510. However, the present exemplary embodiment is not limited to this configuration example. For example, the information processing apparatus 100 may be an edge device such as a camera and the information processing apparatus 500 may be a device connected to an external terminal (universal serial bus (USB) or the like) of the edge device. The information processing apparatus 100 may be a personal computer (PC) and the information processing apparatus 500 may be located on a cloud.

The object detection unit 602 detects "faces wearing glasses" and "faces not wearing glasses" in the same manner as in the object detection unit 202. Alternatively, the object detection unit 602 may function as, for example, a detector for detecting only "faces wearing glasses" or "faces not wearing glasses". For example, in a case where the detector for detecting only "faces wearing glasses" is used, if a "face wearing glasses" is detected, the detection result may indicate a "face wearing glasses", and if a "face wearing glasses" is not detected, the detection result may indicate a "face not wearing glasses". More alternatively, two types of units, i.e., a detector for detecting a face, and a discriminator for discriminating whether glasses are worn, may be used.

Third Exemplary Embodiment

In the above-described exemplary embodiments, processing is performed using a single input image. In a third exemplary embodiment, a case where processing is performed using two input images captured at different image capturing timings will be described. In the third exemplary embodiment to be described below, descriptions of components similar to those in the first exemplary embodiment are omitted. The configuration of the information processing apparatus 100 according to the third exemplary embodiment is similar to the configuration example of the first exemplary embodiment illustrated in FIG. 1.

Figure 9:
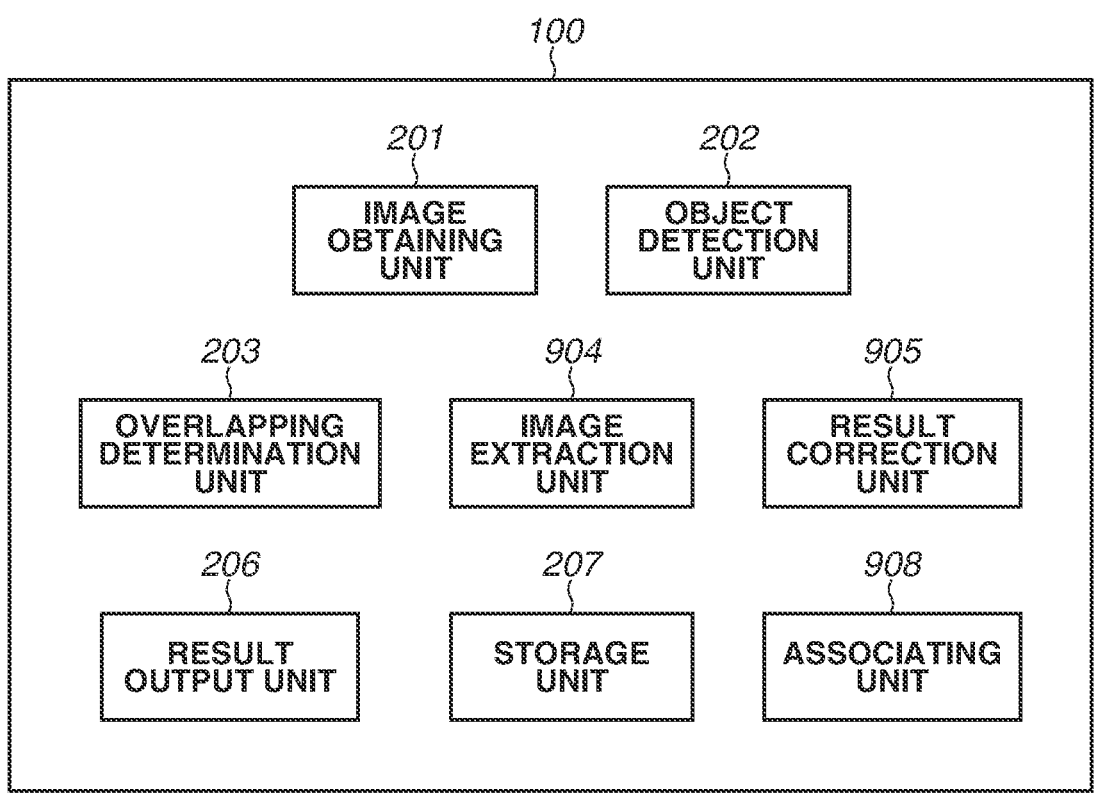
FIG. 9 is a block diagram illustrating a functional configuration example of an information processing apparatus according to a third exemplary embodiment.

FIG. 9 is a block diagram illustrating a functional configuration example of the information processing apparatus 100. Components in FIG. 9 that include the same functions as those of the components illustrated in FIG. 2 are denoted by the same reference numerals, and redundant descriptions are omitted. The information processing apparatus 100 includes the image obtaining unit 201, the object detection unit 202, the overlapping determination unit 203, an image extraction unit 904, a result correction unit 905, the result output unit 206, the storage unit 207, an associating unit 908.

Like the image extraction unit 204, the image extraction unit 904 extracts a designated area from an input image using the input image and a pair of detection results determined to overlap by the overlapping determination unit 203 based on the determination result from the overlapping determination unit 203. The image extraction unit 904 outputs the extracted image and the upper left coordinates of the area to be extracted on the input image. If the number of detection results on the extracted image is two or more, the image extraction unit 904 further outputs a detection result corresponding to a new detection frame including the sum set of detection frames. In this case, the face attribute indicates "unknown whether glasses are worn" and the reliability of detection is "1". The coordinates of the detection frame are transformed into the coordinates on the input image by a method similar to that in the first exemplary embodiment.

The associating unit 908 associates the previous detection result with the current detection result. The associating unit 908 associates the detection result (hereinafter referred to also as "the current detection result" or "the current detection frame") with held tracking information to update the tracking information, and then updates the attribute of the detection result based on the tracking information. As the tracking information, a tracking identification (ID), coordinates (upper left coordinates and lower right coordinates) of the detection frame corresponding to the tracking ID, an attribute, and statistical information about the attribute are stored. The statistical information about the attribute used herein refers to a historical record (number of appearances) of the attribute corresponding to a predetermined number of appearances in the past. In the present exemplary embodiment, the predetermined number is two. For example, if the previous attribute indicates "wearing glasses" and the current attribute indicates "not wearing glasses", the statistical information about the attribute indicates "1" for "wearing glasses" and "1" for "not wearing glasses". If the attribute indicates "unknown whether glasses are worn", the attribute is not added to the statistical information about the attribute.

The associating unit 908 updates the attribute of the current (present) detection result based on information relating to the attribute of the previous detection result. Specifically, the associating unit 908 updates the attribute with the highest frequency of appearance (largest number of appearances) at the time based on the statistical information about the attribute as the attribute of the detection result. If the frequencies of appearance of attributes are the same, the attribute of the current detection result is preferentially used. The current detection result is associated with the held tracking information based on, for example, the coordinates of the detection frame corresponding to each tracking ID and the coordinates of the detection frame corresponding to the current detection result. In the present exemplary embodiment, the distance between the central coordinates of the detection frame corresponding to each tracking ID and the central coordinates of arbitrary current detection frame is calculated for all combinations of detection results, and a combination of the tracking ID with a shortest distance that is less than or equal to a threshold ("100" in the present exemplary embodiment) and the current detection result is obtained. The coordinates corresponding to the tracking ID are updated with the central coordinates of the current detection frame. Tracking IDs that are not associated with the current detection result are deleted. If there is the current detection result that is not associated with the tracking ID, a new tracking ID is generated and the generated tracking ID is added to tracking information.

The result correction unit 905 reflects the detection results on the extracted image in the detection results on the input image. The result correction unit 905 deletes the detection result used to calculate the extracted area from the detection results on the input image, and replaces the deleted detection result with the detection result obtained on the extracted image.

Figure 10:
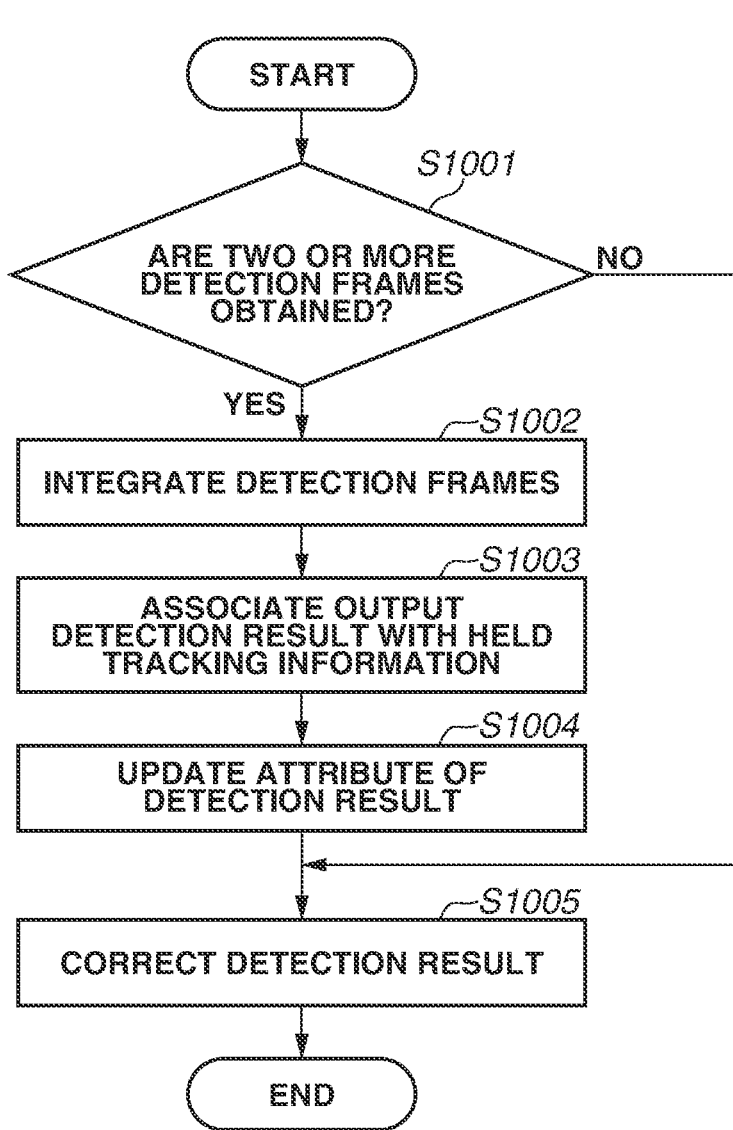
FIG. 10 is a flowchart illustrating object detection processing according to the third exemplary embodiment.

Next, object detection processing to be performed by the information processing apparatus 100 will be described with reference to FIGS. 3, 10, and 11A to 11C. FIG. 10 is a flowchart illustrating object detection processing according to the third exemplary embodiment. FIGS. 11A to 11C each illustrate processing in the flowchart illustrated in FIG. 10.

In the object detection processing according to the third exemplary embodiment, the processing of steps S301 to S306 illustrated in FIG. 3 and the processing of steps S308 and S309 illustrated in FIG. 3 are similar to those in the object detection processing according to the first exemplary embodiment. The object detection processing according to the third exemplary embodiment differs from the object detection processing according to the first exemplary embodiment in regard to the processing of step S307 illustrated in FIG. 3. A detailed processing flow of processing corresponding to the processing of step S307 illustrated in FIG. 3 according to the third exemplary embodiment will be described with reference to FIG. 10.

In step S1001, the result correction unit 905 determines whether the number of detection results on the extracted image obtained in step S306 is two or more. If the result correction unit 905 determines that the number of detection results on the extracted image is two or more (YES in step S1001), the processing proceeds to step S1002. If the result correction unit 905 determines that the number of detection results on the extracted image is less than two (NO in step S1001), the processing proceeds to step S1005. In this example, assume that the detection results on the input image as illustrated in FIG. 4B are obtained and two detection results (detection result G and detection result H) are present as illustrated in FIG. 11A as the detection results on the extracted image. In FIG. 11A, the coordinates of the detection frame correspond to coordinates in the coordinate system of the extracted image.

In step S1002, the image extraction unit 904 calculates a circumscribed rectangle for the sum set of two detection frames based on the pair of detection results output in step S304, like in the processing of step S305, and outputs the detection result corresponding to the detection frame representing the calculated circumscribed rectangle. In the present exemplary embodiment, the image extraction unit 904 calculates the circumscribed rectangle for the sum set of two detection frames based on the pair of the detection results G and H, and outputs a detection result I corresponding to the detection frame representing the calculated circumscribed rectangle. The detection results illustrated in FIG. 11A show that the upper left coordinates of the circumscribed rectangle for the sum set of detection frames corresponding to the two detection results in the coordinate system of the extracted image are (32, 31) and the lower right coordinates of the circumscribed rectangle are (352, 341). The coordinate system of the extracted image is transformed into the coordinate system of the input image, so that the upper left coordinates of the circumscribed rectangle for the sum set of detection results corresponding to the two detection results in the coordinate system on the input image are (20, 200) and the lower right coordinates of the circumscribed rectangle are (340, 510) as illustrated in FIG. 11B.

In step S1003, the associating unit 908 associates the detection result output from the image extraction unit 904 in step S1002 with the held tracking information. In the present exemplary embodiment, the associating unit 908 associates the detection result I output in step S1002 with the held tracking information. An example of associating the detection result I with the held tracking information will be described assuming that tracking information as illustrated in FIG. 11C is held. The central coordinates of the detection frame corresponding to the detection result I are (180, 355), and the central coordinates of the detection frame corresponding to a tracking ID1 are (170, 350). Accordingly, a distance L between the central coordinates of the detection frame corresponding to the detection result I and the central coordinates of the detection frame corresponding to the tracking ID1 is calculated as L=((180−170) ^2+(355−350) ^2) ^(½)≈11.2. The calculated distance L is smaller than the threshold "100", and thus the detection result is set as a candidate to be associated. When this calculation is also performed on the detection result I and a tracking ID2 and a tracking ID3, the distance L between the central coordinates is greater than "100", and thus the detection result is not used as a candidate to be associated. As a result, the detection result I is associated with the tracking ID1.

In step S1004, the associating unit 907 updates the attribute of the detection result based on the tracking information. Since the detection result I is associated with the tracking ID1 and the number of appearances of the "face wearing glasses" is greater than the number of appearances of the "face not wearing glasses" based on the statistical information about the attribute (FIG. 11C) corresponding to the tracking ID, the attribute of the detection result I indicates the "face wearing glasses".

In step S1005, the result correction unit 905 reflects the detection result on the extracted image in the detection result on the input image, like in the first exemplary embodiment. In this case, the result correction unit 205 deletes the detection result A and the detection result B and replaces the deleted detection results A and B with the detection result I.

According to the third exemplary embodiment, a more appropriate detection result can be finally output even when detection results for different attributes overlap in object detection using an image.

Modified Examples

A generally-used technique for object tracking processing can be applied as the method for associating the detection result on the previous input image with the detection result on the current input image in the associating unit 908. In the present exemplary embodiment, a history of an attribute that appears twice is held as the statistical information. Processing similar to the processing according to the present exemplary embodiment can be performed also in a case where a history of an attribute that appears more than twice is held as the statistical information. In the present exemplary embodiment, a history (number of appearances) of an attribute corresponding to the predetermined number of appearances is used as the statistical information about the attribute. Alternatively, an accumulation of reliabilities may be used instead of the number of appearances.

Fourth Exemplary Embodiment

In the first exemplary embodiment described above, an extracted image is generated from an image used for first face detection processing. In a fourth exemplary embodiment, a case where an extracted image is generated from an original image on which the image used for first face detection processing is based will be described. In the fourth exemplary embodiment to be described below, descriptions of components similar to those of the first exemplary embodiment are omitted. The configuration of the information processing apparatus 100 according to the fourth exemplary embodiment is similar to the configuration example according to the first exemplary embodiment illustrated in FIG. 1.

Figure 12:
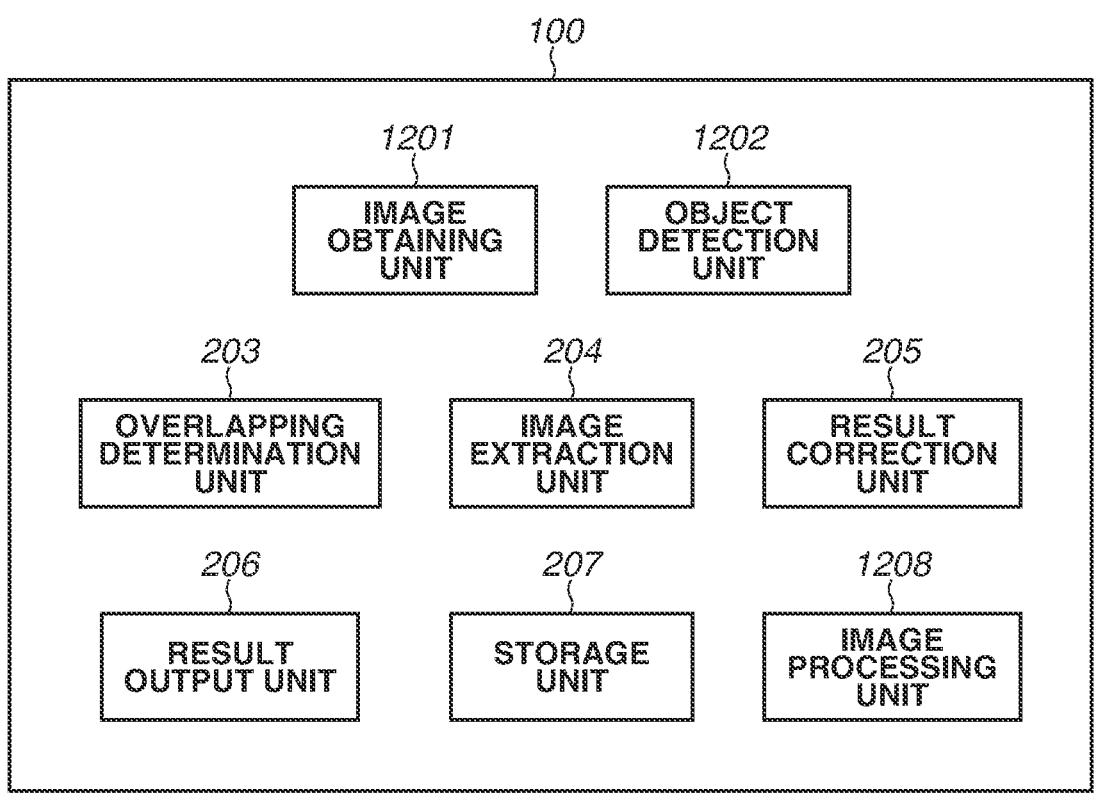
FIG. 12 is a block diagram illustrating a functional configuration example of an information processing apparatus according to a fourth exemplary embodiment.

FIG. 12 is a block diagram illustrating a functional configuration example of the information processing apparatus 100. Components in FIG. 12 that include the same functions as those of the components illustrated in FIG. 2 are denoted by the same reference numerals, and redundant descriptions are omitted. The information processing apparatus 100 includes an image obtaining unit 1201, an object detection unit 1202, the overlapping determination unit 203, the image extraction unit 204, the result correction unit 205, the result output unit 206, the storage unit 207, and an image processing unit 1208.

The image obtaining unit 1201 obtains an image (input image) on which object detection is to be performed. The image obtaining unit 1201 extracts a predetermined range from the obtained image. In the present exemplary embodiment, the image (input image) on which object detection is to be performed is obtained from an external device through the communication I/F unit 103. For example, an RGB image of 1080×720 pixels is used as the input image. The image obtaining unit 1201 extracts, for example, a range represented by upper left coordinates (30, 0) and lower right coordinates (750, 720) from the input image.

Like the object detection unit 202 according to the first exemplary embodiment, the object detection unit 1202 detects an object relating to a plurality of attributes (class) from the image. In the present exemplary embodiment, the object detection unit 1202 detects an object from, for example, an RGB image of 224×224 pixels with a width in the horizontal direction (lateral direction) of 224 pixels and a height in the vertical direction (longitudinal direction) of 224 pixels. The other configuration of the object detection unit 1202 is similar to that of the object detection unit 202 according to the first exemplary embodiment.

The image processing unit 1208 modifies the shape of the image into a designated size, and outputs the modified image and modification magnifications in the longitudinal and lateral directions. Any generally-known technique, such as the bicubic method, can be used as an algorithm for modifying the shape of an image. The super-resolution technique may be used to enlarge an image. In the present exemplary embodiment, the image processing unit 1208 modifies the shape of the image into an image of 224×224 pixels. In this case, when the width of the image before modification is represented by w pixels and the height of the image before modification is represented by h pixels, the modification magnification in the longitudinal direction is (224/w) and the modification magnification in the lateral direction is (224/h).

The result correction unit 205 reflects the detection results on the extracted image from the object detection unit 1202 in the detection results on the input image depending on the number of detection results on the extracted image. The other configuration of the result correction unit 205 is similar to that of the result correction unit 205 according to the first exemplary embodiment.

Figure 13:
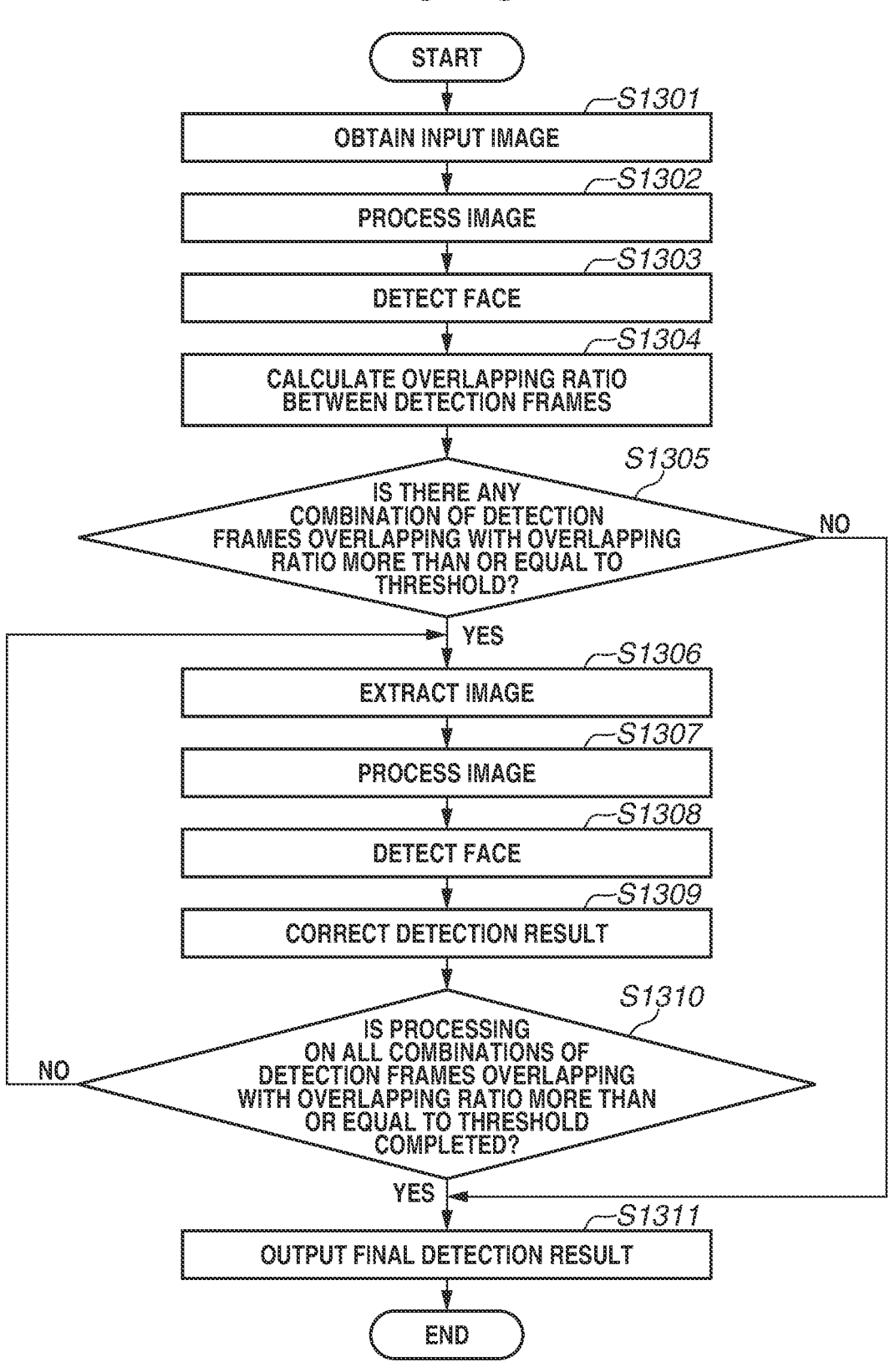
FIG. 13 is a flowchart illustrating object detection processing according to the fourth exemplary embodiment.

Next, processing to be performed by the information processing apparatus 100 will be described with reference to FIG. 13 and FIGS. 14A to 14I. FIG. 13 is a flowchart illustrating object detection processing according to the fourth exemplary embodiment. FIGS. 14A to 14I each illustrate object detection processing according to the fourth exemplary embodiment.

Figure 14A:
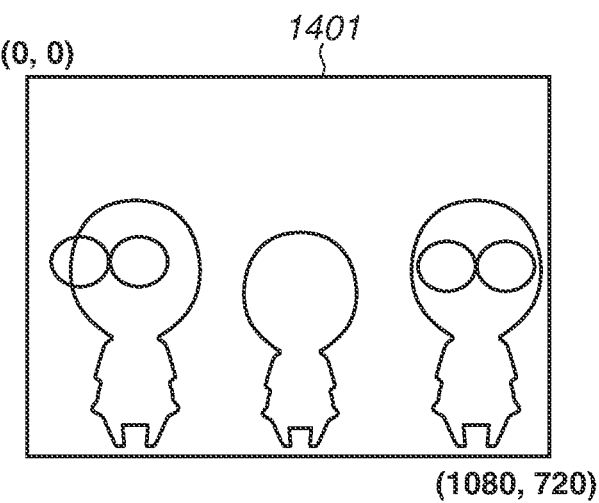
FIG. 14A illustrates an example of an input image obtained in object detection processing according to the fourth exemplary embodiment.
Figure 14B:
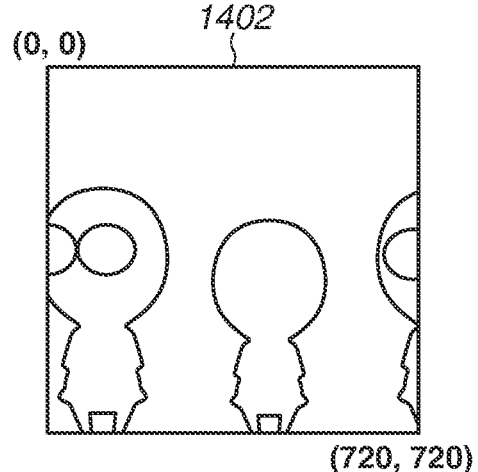
FIG. 14B illustrates an example of an extracted image in object detection processing according to the fourth exemplary embodiment.

In step S1301, the image obtaining unit 1201 obtains an input image (image on which object detection is performed), and extracts a range represented by upper left coordinates (30, 0) and lower right coordinates (750, 720) from the obtained input image, thereby obtaining an image of 720× 720 pixels. FIG. 14A illustrates an example of an input image 1401, and FIG. 14B illustrates an example of an image 1402 of 720×720 pixels extracted from the input image 1401.

Figure 14C:
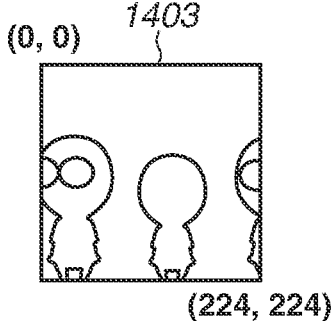
FIG. 14C illustrates an example of a first processing target image obtained in object detection processing according to the fourth exemplary embodiment.

In step S1302, the image processing unit 1208 modifies the shape of the image of 720×720 pixels obtained in step S1301 into an image of 224×224 pixels (hereinafter referred to as a first processing target image). In this case, the modification magnification in the longitudinal direction and the modification magnification in the lateral direction are (224/720). FIG. 14C illustrates an example of a first processing target image 1403.

Figures 14D, 14E, 14F:
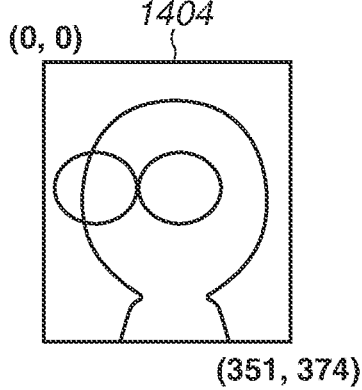
FIG. 14D illustrates an example of detection results in object detection processing according to the fourth exemplary embodiment.
FIG. 14E illustrates an example of detection results in object detection processing according to the fourth exemplary embodiment.
FIG. 14F illustrates an example of an extracted image in object detection processing according to the fourth exemplary embodiment.

In step S1303, the object detection unit 1202 performs face detection processing for detecting the face of a person using the first processing target image, like in step S302 illustrated in FIG. 3, and detects "faces wearing glasses" and "faces not wearing glasses" from the first processing target image. FIG. 14D illustrates an example of detection results of face detection processing on the first processing target image. In the example illustrated in FIG. 14D, three detection results A to C are obtained and the upper left coordinates (x1, y1) and the lower right coordinates (x2, y2) of each detection frame, the attribute, and the reliability are output. The coordinates of each detection frame illustrated in FIG. 14D correspond to coordinates on the first processing target image.

In step S1304, the overlapping determination unit 203 calculates the overlapping ratio between detection frames for each combination of detection results on the first processing target image using a pair of detection results arbitrarily selected from the detection results on the first processing target image. In this example, the upper left coordinates of the detection frame corresponding to the detection result A are (0, 62), and the lower right coordinates of the detection frame corresponding to the detection result A are (85, 156). The upper left coordinates of the detection frame corresponding to the detection result B (0, 65), and the lower right coordinates of the detection frame corresponding to the detection result B are (91, 159). Accordingly, the overlapping ratio between the detection frames corresponding to the detection result A and the detection result B, respectively, is calculated as IoU (A, B)=((85−0)× (156−65))÷((85−0)× (156−62)+(91−0)× (159−65)−((85−0)× (156−65))), ≈0.88. The overlapping ratio between detection frames in the other combinations of detection frames is "0".

In step S1305, the overlapping determination unit 203 determines whether there is a combination of detection results overlapping with the overlapping ratio calculated in step S1304 being more than or equal to the threshold. If the overlapping determination unit 203 determines that there is a combination of detection results overlapping with the overlapping ratio more than or equal to the threshold (YES in step S1305), the overlapping determination unit 203 outputs the combination of detection results overlapping with the overlapping ratio more than or equal to the threshold, and then the processing proceeds to step S1306. On the other hand, if the overlapping determination unit 203 determines that there is no combination of detection results overlapping with the overlapping ratio more than or equal to the threshold (NO in step S1305), the processing proceeds to step S1311. In the present exemplary embodiment, assume that the threshold for the overlapping ratio is 0.5. If the overlapping determination unit 203 determines that there is a pair of detection results overlapping with the overlapping ratio calculated in step S1304 being 0.5 or more (YES in step S1305), the processing proceeds to step S1306. If there is no pair of detection results overlapping with the overlapping ratio of 0.5 or more (NO in step S1305), the processing proceeds to step S1311. In this example, since the overlapping ratio between the detection frames corresponding to the detection result A and the detection result B, respectively, is more than or equal to 0.5, the overlapping determination unit 203 outputs the combination (A, B) overlapping with the overlapping ratio of 0.5 or more, and then the processing proceeds to step S1306.

In step S1306, the image extraction unit 204 extracts a designated area from the input image using the input image and the pair of detection results output in step S1305, and outputs the extracted image and the upper left coordinates of the area to be extracted on the input image. Specifically, first, the image extraction unit 204 transforms the coordinates of two detection frames from the pair of detection results into coordinates of the input image using information about the range extracted from the input image and modification magnifications. In this example, the upper left coordinates of the detection frame corresponding to the detection result A are (0, 62). Accordingly, the upper left coordinates of the detection result A on the input image are calculated as (30+0÷(224/720), 0÷62+(224/720))=(30, 199) using the modification magnification (224/720). FIG. 14E illustrates detection results calculated for the other coordinates.

Next, the image extraction unit 204 calculates a circumscribed rectangle for the sum set of two detection frames based on the pair of detection results, and calculates the upper left coordinates and the lower right coordinates of the area to be extracted based on the calculated circumscribed rectangle. Detailed processing for this process is similar to the processing in step S305 illustrated in FIG. 3. In this example, the upper left coordinates of the area to be extracted are (1, 168), and the lower right coordinates of the area to be extracted are (352, 542). FIG. 14F illustrates an example of an extracted image 1404 that is extracted based on the upper left coordinates and the lower right coordinates of the area to be extracted that are calculated as described above. The upper left coordinates of the area to be extracted are (1, 168) and the lower right coordinates of the area to be extracted are (352, 542). Accordingly, an image of 351×374 pixels is obtained as the extracted image 1404.

Figures 14G, 14H, 14I:
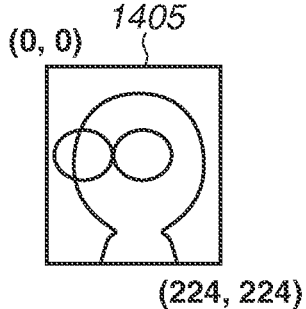
FIG. 14G illustrates an example of a second processing target image obtained in object detection processing according to the fourth exemplary embodiment.
FIG. 14H illustrates an example of a detection result in object detection processing according to the fourth exemplary embodiment.
FIG. 14I illustrates an example of the detection result in object detection processing according to the fourth exemplary embodiment.

In step S1307, the image processing unit 1208 modifies the shape of the image of 351×374 pixels extracted in step S1306 into an image of 224×224 pixels (hereinafter referred to as a second processing target image). In this case, the modification magnification in the lateral direction is (224/351) and the modification magnification in the longitudinal direction is (224/374). FIG. 14G illustrates an example of the second processing target image.

In step S1308, the object detection unit 1202 performs face detection processing for detecting the face of a person using the second processing target image, like in step S306 illustrated in FIG. 3, thereby detecting "faces wearing glasses" and "faces not wearing glasses" from the second processing target image. FIG. 14H illustrates an example of the detection result of face detection processing on the second processing target image. In the example illustrated in FIG. 14H, one detection result E is obtained, and the upper left coordinates (x1, y1) and the lower right coordinates (x2, y2) of the detection frame, the attribute, and the reliability are output. The coordinates of the detection frame illustrated in FIG. 14H correspond to coordinates on the second processing target image.

In step S1309, the result correction unit 205 reflects the detection results on the extracted image in the detection results on the input image based on the detection result on the second processing target image obtained in step S1308. Specifically, like in step S307 illustrated in FIG. 3, the result correction unit 205 transforms the coordinates of the detection result on the second processing target image into the coordinates on the input image. In this case, the result correction unit 205 transforms the coordinates of the detection result on the second processing target image into the coordinates of the input image using the upper left coordinates of the area to be extracted on the input image obtained in step S1306 and information about the modification magnifications obtained in step S1307. FIG. 14I illustrates an example of the detection result E on the input image.

In step S1310, the result output unit 206 determines whether the processing on all combinations of detection results overlapping with the overlapping ratio more than or equal to the threshold is completed. If the result output unit 206 determines that the processing on all combinations of detection results overlapping with the overlapping ratio more than or equal to the threshold is completed (YES in step S1310), the processing proceeds to step S1311. If the result output unit 206 determines that the processing on all combinations of detection results overlapping with the overlapping ratio more than or equal to the threshold is not completed (NO in step S1310), the processing returns to step S1306 to execute the processing of step S1306 and subsequent steps on the combination of detection results on which the processing has not been executed.

In step S1311, the result output unit 206 outputs an image obtained by superimposing the final detection result for the input image on the input image. Then, the processing on the current input image is terminated, and the processing on the next input image is started.

According to the fourth exemplary embodiment, the extracted image to be used for second detection processing is extracted from the input image, instead of using the image used for first detection processing. This makes it possible to finally output a more appropriate detection result as the detection result of object detection on the input image, for example, even when the resolution of the image used for first detection processing becomes lower than that of the input image due to image modification processing or the like. For example, even when an object to be detected is partially impaired when the image used for first detection processing is cut out of the input image, a more appropriate detection result can be finally output as the detection result of object detection on the input image.

Modified Examples

The image obtaining unit 1201 extracts one area from the input image. Alternatively, the processing of steps S1302 to S1311 may be repeatedly performed on each area so that a plurality of areas can be extracted. The processing according to the fourth exemplary embodiment can be incorporated into the second and third exemplary embodiments described above.

Other Exemplary Embodiments

The present invention can also be implemented by the following processing. That is, a program for implementing one or more functions according to the exemplary embodiments described above is supplied to a system or an apparatus via a network or a storage medium, and one or more processors in a computer of the system or the apparatus read out and execute the program. The present invention can also be implemented by a circuit (e.g., an application-specific integrated circuit (ASIC)) for implementing one or more functions according to the exemplary embodiments.

The present invention is not limited to the above-described exemplary embodiments. Various changes and modifications may be made without departing from the spirit and scope of the present invention. Accordingly, the following claims are attached to publicize the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an aspect of the present invention, it is possible to finally output a more appropriate detection result in object detection using an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more hardware processors; and
one or more memories storing one or more programs configured to be executed by the one or more hardware processors, the one or more programs including instructions to:
detect an object relating to a plurality of attributes from an image;
determine overlapping of detection results for different attributes on detection results;
extract a second image from the first image based on a determination result relating to the overlapping of detection results of object detection on the first image; and
correct the detection results of object detection based on detection results of object detection on the second image extracted from the first image.

2. The information processing apparatus according to claim 1, wherein the second image is an image obtained by extracting an area where areas of the detection results for different attributes overlap with a predetermined ratio or more on the first image.

3. The information processing apparatus according to claim 1, wherein the second image is an image obtained by performing at least one of horizontal flip, position shifting, and change of a pixel value on an area of the object detected from the first image.

4. The information processing apparatus according to claim 1, wherein the one or more programs including instructions to obtain the first image from an input image, wherein the second image is an image extracted from either the input image or the first image.

5. The information processing apparatus according to claim 4, wherein the one or more programs including instructions to extract the second image from the input image based on a determination result relating to the detection results of object detection on the first image.

6. The information processing apparatus according to claim 4, wherein the second image is an image obtained by extracting an area where areas of the detection results for different attributes on the first image overlap with a predetermined ratio or more.

7. The information processing apparatus according to claim 4, wherein the second image is an image obtained by performing at least one of horizontal flip, position shifting, and change of a pixel value on an area of the object detected from the first image.

8. The information processing apparatus according to claim 1, wherein in a case where areas of the detection results for different attributes overlap with a predetermined ratio or more, object detection is performed on the second image.

9. The information processing apparatus according to claim 1, wherein an overlapping ratio between the detection results for different attributes is calculated, and wherein in a case where the calculated overlapping ratio is more than or equal to a threshold, object detection is performed on the second image.

10. The information processing apparatus according to claim 1, wherein the second image is an image of an area set such that a ratio of the area including the detection results for different attributes determined to overlap to the second image becomes a ratio based on specifications of object detection.

11. The information processing apparatus according to claim 1, wherein overlapping of the detection results for different attributes on the detection results of object detection on the second image is determined, and wherein in a case where it is determined that overlapping of the detection results for different attributes on the detection result of object detection on the second image corresponds to overlapping between the detection result for a first attribute and the detection result for a second attribute, the detection results of object detection on the first image is corrected using a third attribute different from the first attribute and the second attribute.

12. The information processing apparatus according to claim 11, wherein the third attribute is an attribute indicating an unknown result.

13. The information processing apparatus according to claim 1, wherein the one or more programs including instructions to associate a previous detection result with a current detection result and to update an attribute of the current detection result based on information about an attribute of the previous detection result.

14. The information processing apparatus according to claim 13, wherein statistical information about attributes in predetermined previous image detection results is obtained, and wherein an attribute with a highest frequency of appearance in the statistical information is used as the attribute of the current detection result.

15. The information processing apparatus according to claim 1, wherein the different attributes include an attribute indicating face wearing glasses and an attribute indicating face not wearing glasses.

16. An information processing method comprising:

detecting an object relating to a plurality of attributes from a first image;

determining overlapping of detection results for different attributes on detection results obtained in the object detection;

extracting a second image from the first image based on a determination result relating to the overlapping of detection results of object detection on the first image; and correcting the detection results of object detection on the first image based on detection results of object detection on the second image extracted from the first image.

17. A non-transitory storage medium storing a program for causing a computer to execute processing comprising:

detecting an object relating to a plurality of attributes from a first image;

determining overlapping of detection results for different attributes on detection results obtained in the object detection;

extract a second image from the first image based on a determination result relating to the overlapping of detection results of object detection on the first image and correcting the detection results of object detection on the first image based on detection results of object detection on the second image extracted from the first image.

* * * * *